US011444870B2

(12) United States Patent
Iwasaki

(10) Patent No.: US 11,444,870 B2
(45) Date of Patent: Sep. 13, 2022

(54) CIRCUITRY FOR DEMARCATION DEVICES AND METHODS UTILIZING SAME

(71) Applicant: Sean Iwasaki, Chicago, IL (US)

(72) Inventor: Sean Iwasaki, Chicago, IL (US)

( * ) Notice: Subject to any disclaimer, the term of this patent is extended or adjusted under 35 U.S.C. 154(b) by 0 days.

(21) Appl. No.: 16/917,475

(22) Filed: Jun. 30, 2020

(65) Prior Publication Data
US 2021/0021514 A1 Jan. 21, 2021

Related U.S. Application Data

(63) Continuation-in-part of application No. 16/839,260, filed on Apr. 3, 2020, and a continuation-in-part of application No. 16/415,899, filed on May 17, 2019, now Pat. No. 10,985,440, said application No. 16/839,260 is a continuation of application No. 15/687,862, filed on Aug. 28, 2017, now Pat. No. 10,637,776, said application No. 16/415,899 is a continuation of application No. 15/294,858, filed on Oct. 17, 2016, now Pat. No. 10,446,909.

(60) Provisional application No. 62/381,168, filed on Aug. 30, 2016, provisional application No. 62/243,957, filed on Oct. 20, 2015.

(51) Int. Cl.
| *H04L 45/60* | (2022.01) |
| *H04L 49/109* | (2022.01) |
| *H04L 49/00* | (2022.01) |
| *H04L 49/35* | (2022.01) |

(52) U.S. Cl.
CPC .......... *H04L 45/60* (2013.01); *H04L 49/109* (2013.01); *H04L 49/30* (2013.01); *H04L 49/355* (2013.01)

(58) Field of Classification Search
CPC ....... H04L 45/60; H04L 49/109; H04L 49/30; H04L 49/355
See application file for complete search history.

(56) References Cited

U.S. PATENT DOCUMENTS

| 5,368,041 A * | 11/1994 | Shambroom | G16Z 99/00 128/901 |
| 7,636,802 B1 * | 12/2009 | Baxter | H03K 19/017581 710/33 |
| 10,637,776 B2 * | 4/2020 | Iwasaki | H04L 49/30 |
| 2003/0066947 A1 * | 4/2003 | Alwan | H04B 10/0799 250/206 |
| 2007/0086792 A1 * | 4/2007 | Regev | H04B 10/66 398/209 |
| 2010/0280858 A1 * | 11/2010 | Bugenhagen | H04L 43/00 709/224 |
| 2011/0134988 A1 * | 6/2011 | Chen | H04L 25/03038 375/230 |

(Continued)

*Primary Examiner* — Harry H Kim
(74) *Attorney, Agent, or Firm* — Charles T. Riggs, Jr.

(57) ABSTRACT

The present subject matter relates to methods, systems, devices, circuitry and equipment providing for communication service to be transported between first and second networks, and which monitors the communication service and/or injects test signals, and which can provide redundancy. At least one demarcation point or line is established between the first network and the second network, and/or between the first network, the second network and/or a third network. The Circuitry comprises a plurality of input amplifiers, output amplifiers, and multiplexer switches between a plurality of Port connectors. An SFP module or a WSFP module is inserted in the Ports.

18 Claims, 33 Drawing Sheets

(56) References Cited

U.S. PATENT DOCUMENTS

| | | | |
|---|---|---|---|
| 2011/0182191 A1* | 7/2011 | Jackson | H04L 43/50 370/250 |
| 2011/0191503 A1* | 8/2011 | Kakish | G06F 13/10 710/305 |
| 2014/0016479 A1* | 1/2014 | Coomber | H04L 43/50 370/252 |
| 2016/0036935 A1* | 2/2016 | Jaskiewicz | H01M 4/525 709/217 |
| 2016/0098336 A1* | 4/2016 | Loebig | G06F 11/3409 710/16 |
| 2016/0352653 A1* | 12/2016 | Ranganathan | H04L 49/30 |
| 2017/0097842 A1* | 4/2017 | Bugenhagen | G06F 13/102 |
| 2018/0131401 A1* | 5/2018 | Bonde | H04B 1/38 |
| 2020/0295862 A1* | 9/2020 | Iwasaki | H04B 10/077 |
| 2020/0296034 A1* | 9/2020 | Iwasaki | H04L 49/30 |

\* cited by examiner

FIGURE 21A  FIGURE 21B  FIGURE 21C
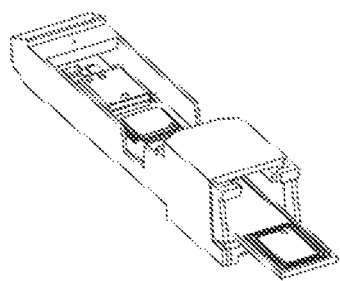
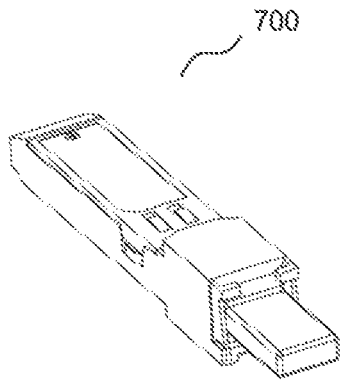
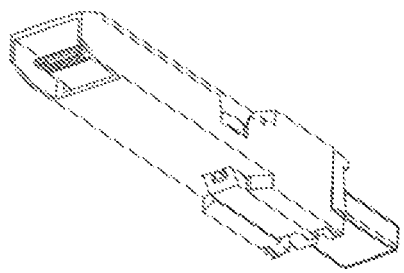
FIGURE 21D
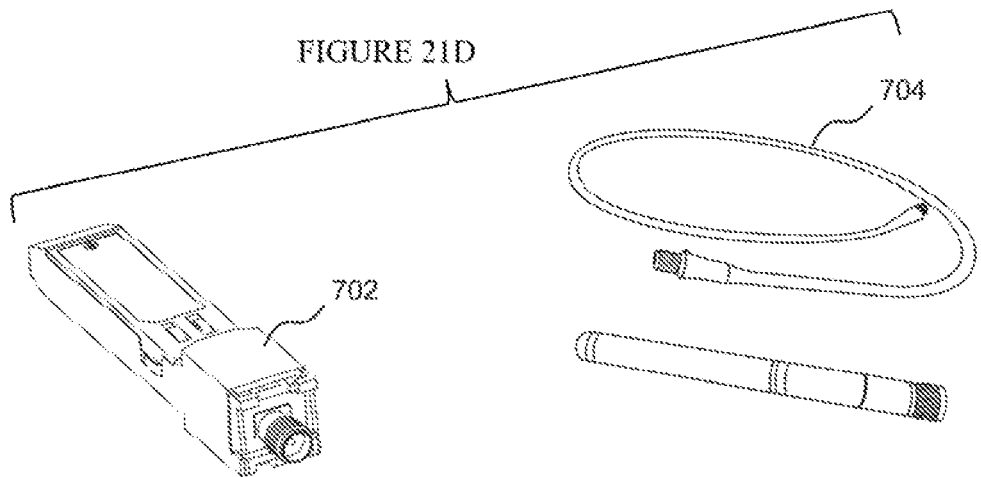
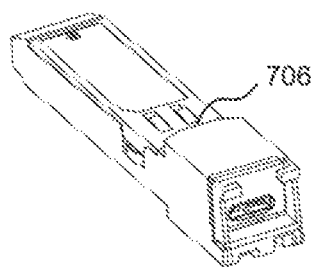
FIGURE 21E FIGURE 23B
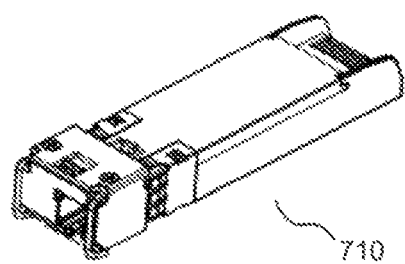
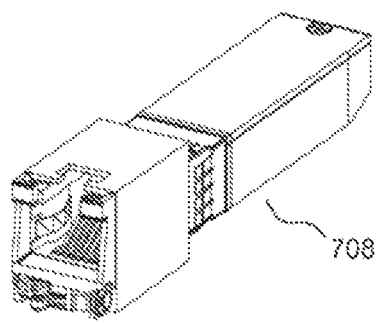
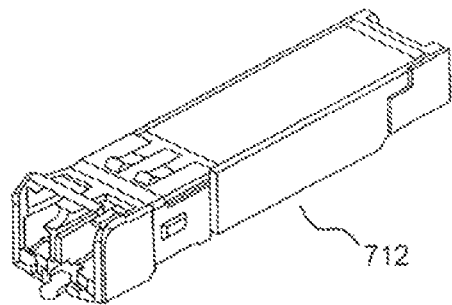
FIGURE 23A
FIGURE 23C

CIRCUITRY FOR DEMARCATION DEVICES AND METHODS UTILIZING SAME

RELATED APPLICATION

This application is a continuation-in-part of U.S. application Ser. No. 16/839,260 entitled Multi-functional Circuitry for Communications Networks and Methods and Devices Utilizing Same, filed Apr. 3, 2020, which is a continuation of U.S. application Ser. No. 15/687,862 entitled Multi-functional Circuitry for Communications Networks and Methods and Devices Utilizing Same, filed Aug. 28, 2017, now U.S. Pat. No. 10,637,776 issued Apr. 28, 2020, and which claims priority to U.S. Provisional Application Ser. No. 62/381,168 filed Aug. 30, 2016, the entire disclosures of which are herein incorporated by reference. This application is also a continuation-in-part of U.S. application Ser. No. 16/415,899 entitled Small Form Factor Pluggable Unit with Wireless Capabilities, filed May 17, 2019, which is a continuation of U.S. application Ser. No. 15/294,858 entitled Small Form Factor Pluggable Unit with Wireless Capabilities, filed Oct. 17, 2016, now U.S. Pat. No. 10,446,909 issued on Oct. 15, 2019, and which claims priority to Provisional Application Ser. No. 62/243,957 filed Oct. 20, 2015, the entire disclosures of which are herein incorporated by reference.

BACKGROUND

The Public Switched Telephone Network (PSTN) provides plain old telephone phone service (POTS) to the residential customer over a twisted cable pair. The Federal Communication Commission (FCC) created regulations to identify and define ownership of the equipment and facilities for POTS services. The Demarcation point was established as the physical dividing line or boundary of POTS ownership between the PSTN and the customer. This Demarcation point establishes the phone service handoff and the associated responsibilities of performance, installation, and maintenance for the PSTN and the customer. A Demarcation point for POTS is typically represented by the PSTN or service provider's grey color network interface Device (NID) installed on the exterior side of a residential house. The customer installs their wire cable into the service providers RJ11 modular connector, which the RJ11 modular connector is located inside the NID. The Demarcation line is the RJ11 module connector.

Other types of a Demarcation point or line is the outside service plant (OSP) cabinets, which these OSP cabinets are centrally located to provide communication service to a serving area. In this application, the Demarcation point is a specified secured location inside the OSP cabinet where the customer only has access. This secured location may house a telephone wiring punch-down block (Type 66), a wire cable patch panel, or a fiber optic cable patch panel as the Demarcation point.

By way of further background, small form factor pluggable (SFP) Devices are used to provide a flexible means of providing communication services for the telecommunication network. The SFP Devices are typically deployed on communication network equipment such as an Ethernet access switch, Ethernet router, a broadband fiber multiplexer, or media converters. SFP Devices are designed to support optical and wired Ethernet, TDM SONET, Fiber Channel, and other communications standards. As disclosed in my U.S. Pat. No. 10,446,909, SFP Devices can also support a wireless interface, which wireless SFP (WSFP) Device can support IEEE802.11 (Wi-Fi), Bluetooth, LTE, 4G, 5G, and other wireless technologies. Due to its small and portable physical size, SFP Devices have expanded in specifications to address other applications. SFP Devices presently are defined for SFP, SFP+, QSFP, QSFP+, QSPF28, QSFP-DD and OSPF technologies. SFP Devices are standardized among equipment vendors and network operators to support interoperability. Due to the low cost, size, and interoperability, SFP Devices are used extensively in all communication service applications.

The telecommunication service and network have significantly evolved beyond the phone service. Telecommunication service provides voice, data, and video using wire cable, coax cable, fiber optic cables, and wireless service as a transport medium. The Demarcation point applies to all communication services, voice, data, video or any combination thereof. The Demarcation point location determination may also be subject to a minimum point of entry (MPOE). MPOE is the most practical location to establish a Demarcation point at the serving facility. The information infrastructure spans in size and complexity from a simple voice call to a myriad of complex and dynamic information flow for home automation, video streaming, ecommerce and cloud computing. In every information flow, there are boundaries which define privacy, ownership, and responsibilities between the communicating recipients. These boundaries are now virtual, logical, or physical and can be located anywhere.

Presently, there is a need to establish a Demarcation point for these boundaries. Concurrently, there Is a need to allow communications services to be monitored and/or tested to ensure the services are high in quality and reliable. The methods, systems, Devices and Circuitry disclosed herein fulfill these and other such needs.

One example of a prior art Demarcation Device is illustrated in the diagram of FIG. 1 (prior art), which depicts use of a "Universal Demarcation Point" Device for providing multiple services for residential customers. This Device provides audio, data, and video services through dedicated interfaces RJ type modular and coax. This hybrid cable is comprised of a combination of wire, power, and optical cables.

There are a number of disadvantages to a universal Demarcation type Device as shown in FIG. 1 (prior art). First, this prior art Device provides a Demarcation point with dedicated services audio, data, and video services. If new services are added or changed after installation, the prior art Device must be powered off, disassembled, and updated for the new service. This service update may require the prior art Device to be updated at a service location or replaced with a new updated prior art Device. In either situation, the service is disrupted for an extend time. Second, this prior art Device does not provide an off-the-shelf service interface for any service or connector updates, replacements, or repairs. Third, this prior art Device test functionality involves disengaging the service by removing the plug or coax from the prior art Device connector for service isolation. The customer must then connect a test Device into the modular or coax connector to test their side of the Demarcation point. This prior art Device does not provide a Demarcation point with removable SFP type Devices or a Demarcation point with a differential signal Port interface. This prior art Device does not provide local or remote monitoring of either side of the Demarcation point and without disrupting service. This prior art Device does not allow remote injecting of signals to either side of the Demarcation point. This prior art Device does not provide a Demarcation point for monitoring and/or signal inject. This Device does not provide a Demarcation point for wireless services or a Demarcation point for wireless service with wireless-to-wireless signal conversion.

Another prior art of a Demarcation Device is illustrated in the diagram of FIG. 2 (prior art), which depicts use of an "Optical Network Demarcation" Device for providing optical services for the service provider network. This prior art Device provides a method to detect optical signal faults from the recipient network. Upon detecting an optical loss of signal, the prior art Device will automatically perform an optical signal loopback to the service provider network.

There are a number of disadvantages to this prior art Device as shown in FIG. 2 (prior art). First, this prior art Device cannot provide a Demarcation point interface for wire cable, coax cable, or wireless service. This prior art Device provides a Demarcation point with fixed fiber optic media interface. Second, this prior art Device provides a Demarcation point with fixed fiber optic interface connectors, such as SC, ST, or FC connectors. Another prior art Device is required at the Demarcation point if a different fiber optic interface connector is required. This prior art Device does not provide local or remote monitoring of either side of the Demarcation point and without disrupting service. This prior art Device does not allow remote injecting of signals to either side of the Demarcation point. This prior art Device does not provide a Demarcation point for monitoring and/or inject. This Device does not provide a Demarcation point for wireless services or a Demarcation point for wireless service with wireless-to-wireless signal conversion.

Another prior art of a Demarcation Device is illustrated in the diagram of FIG. 3 (prior art), which depicts use of a "Demarcation Switch" Device for selecting between different wireless service providers. This prior art Device connects via a high speed connector to two wireless routers to establish a Demarcation point between two wireless service providers. The prior art Device connects to an aggregation switch to transport the wireless service to another switch which distributes the wireless service among many Devices.

There are a number of disadvantages to a Demarcation switch type Device as shown in FIG. 3 (prior art). First, this Device provides a Demarcation point by selecting between two wireless routers by means of a high-speed line. The prior art Device is then connected to other switches to distribute the wireless service to various Devices. The prior art Device connections among the switches and wireless routers are high speed fixed lines, either wired cable or optical cables, which are fixed signal and media interfaces. This prior art Device does not provide local or remote monitoring of either side of the Demarcation point and without disrupting service. This prior art Device does not allow remote injecting of signals to either side of the Demarcation point. This prior art Device does not provide a Demarcation point for monitoring and/or signal inject. This Device does not provide a Demarcation point for wireless services or a Demarcation point for wireless service with wireless-to-wireless signal conversion. This prior art Device does not provide a redundant path to ensure service availability.

Another prior art Demarcation Device is illustrated in the diagram of FIG. 4 (prior art), which depicts use of a "Demarcation" Device for interfacing different network services and signal formats for signal processing and forwarding to various Devices. This Device allows different communications services such as telephone switch phone services, internet, and wireless network to be received for signal format processing and forwarding.

There are a number of disadvantages to this type of Demarcation Device as shown in FIG. 4 (prior art). First, this Device provides a Demarcation point which is dedicated for a network, namely the end user network. This Device cannot be used exclusively by the telephone switch network, internet network, or wireless network. This Device does not provide a Demarcation point with removable SFP type Devices or a Demarcation point with a differential signal Port interface. This Device does not provide signal monitoring and/or injecting. This Device does not provide a Demarcation point for monitoring and/or signal inject. This Device does not provide a Demarcation point for wireless services or a Demarcation point for wireless service with wireless-to-wireless signal conversion.

Another prior art of a Demarcation Device is illustrated in the diagram of FIG. 5 (prior art), which depicts use of another "Demarcation" Device for interfacing different network services and signal format for signal processing and forwarding. This Device allows different communications services such as telephone switch phone services, internet, and wireless network to be receive for signal format processing and forwarding. The prior art Device requires an external antenna to be installed, typically at the exterior side or top of the facility structure.

There are a number of disadvantages to this type of Demarcation Device as shown in FIG. 5 (prior art). First, this Device provides a Demarcation point which is dedicated for a network, namely the end user network. This Device cannot be used exclusively by the telephone switch network, internet network, or wireless network. This Device does not provide a Demarcation point with removable SFP type Devices or a Demarcation point with a differential signal Port interface. This Device does not provide signal monitoring and/or injecting. This Device does not provide a Demarcation point for monitoring and/or signal inject. This Device does not provide a Demarcation point for wireless services or a Demarcation point for wireless service with wireless-to-wireless signal conversion. This prior art Device does not provide a redundant path to ensure service availability.

The following prior art references provide general background information regarding Demarcation Devices for communications networks, and each are herein incorporated by reference:

U.S. Pat. No. 7,565,079 entitled System and Method for Optical Network Demarcation issued to Simanonis, et al. on Jul. 21, 2009.

U.S. Pat. No. 5,572,348 entitled Universal Demarcation Point issued to Carlson, et al. on Nov. 5, 1996.

U.S. Pat. No. 7,596,314 entitled Optical Communication Management Systems issued to Manifold on Sep. 29, 2009.

U.S. Pat. No. 7,054,417 entitled Advanced Call Screening Appliance issued to Casey, et al. on May 30, 2006.

U.S. Pat. No. 8,588,571 entitled Installation of Fiber-to-the-Premise Using Optical Demarcation Devices issued to Lam, et. al. on Nov. 19, 2013.

U.S. Pat. No. 7,480,503 entitled System and Methods for Providing Telecommunication Services issued to McClure, et al. on Jan. 20, 2009.

SUMMARY

The present disclosure relates to one or more methods, systems, devices and circuitry which establish a demarcation point or an extend demarcation point between networks and for the communication service to monitor or tap the communication services on either side of the network. The methods, systems, Devices and Circuitry of the present disclosure allow for the monitoring and/or testing of the communication service locally or remotely using any physical interface, including wire cable, optical cable, or wireless.

There are a number of advantages to remotely monitor the tapped communication services of a Demarcation Device. The monitored or tapped communication service is transported back to the network's facility, where the communication service can be analyzed in its entirety. The network can use and leverage the sophisticated and expensive test and monitoring equipment at their facility. The network can also leverage their complex and proprietary operation, administration, and maintenances process to test the Demarcation Devices, which these Devices may be located anywhere geographically. Without the complexity of having to locally collect and analyze the monitored communication services performance, the methods, systems, Devices and Circuitry of the present disclosure are of an extremely simplified design, are more reliable, are easier to install and service, and are very cost effective. In addition, the methods, systems, Devices and Circuitry of the present disclosure can be coordinated, implemented, and integrated into the network's infrastructure in a timely and operationally efficient manner.

The methods, systems, Devices and Circuitry of the present disclosure can establish a Demarcation point through an SFP Device. The methods, systems, Devices and Circuitry of the present disclosure do not disrupt or add impairments to the communication services when monitoring or when replacing the SFP monitoring Device. The SFP Device can provide the Demarcation point with a wired, coax, optical, or wireless interface with the appropriate SFP Device. Alternately, the methods, systems, Devices and Circuitry of the present disclosure can establish a Demarcation point through an SFP Port connector. The methods, systems, Devices and Circuitry of the present disclosure can also establish a Demarcation point through a monitoring and/or test interface or SFP Port connector.

The methods, systems, Devices and Circuitry of the present disclosure can also establish a Demarcation point for wireless services or an extended wireless Demarcation point. The present disclosure can provide a wireless Demarcation point or an extended wireless Demarcation point by simply connecting an appropriate wireless SFP into its Port connector. This can then be installed and implemented where needed due to the small mechanical size and simplicity of installation.

The methods, systems, Devices and Circuitry of the present disclosure can also provide a wireless Demarcation point by wireless signal conversion, which can perform a wireless-to-wireless signal conversion.

The methods, systems, Devices and Circuitry of the present disclosure can also provide two independent Demarcation points from two separate communication services. If the customer requests an additional service from the network, the methods, systems, Devices and Circuitry of the present disclosure can be provisioned to provide another communication service with a separate independent Demarcation point. This additional communication service interface can be physically independent and the serving network separate from the other Demarcation point communication service. The network would benefit with a quick increase in revenue and customer satisfaction.

The methods, systems, Devices and Circuitry of the present disclosure can also establish an additional Demarcation point to another network from another separate communication service.

The methods, systems, Devices and Circuitry of the present disclosure provide solutions to address the disadvantages and/or problematic issues with other Demarcation Devices or switches and/or other prior art communications methods, systems and Devices. The present disclosure also presents cost effective and operational efficient method(s), system(s) and Device(s) in achieving and enhancing the quality and reliability of present and future communication services.

The methods, systems, Devices and/or Circuitry and equipment of the present disclosure provide functionality which, inter aha:

allows a network to establish a Demarcation point at a Port interface.

allows a network to establish a Demarcation point at a Port connector.

allows a network to remotely monitor communication services at the Demarcation point.

allows a network to remotely monitor communication services and then inject test signals at the Demarcation point.

allows a network to provide a redundant path to ensure the availability and reliability of the communication service.

will not require complex test equipment to monitor and/or test communication service at the Demarcation point.

will not disrupt communication signals when monitoring.

will not disrupt communication signals when replacing or inserting Devices into the monitor Potts.

allows a network to provide a Demarcation point with a wireless interface.

allows a network to provide a Demarcation point for monitoring and/or testing.

allows a network to provide two independent Demarcation points from two independent communication services.

allows a network to provide communication service redundancy at the Demarcation point.

allows the conversion of any physical media to a wireless media on any Port connector.

allows the extension of a wireless service.

allows the con version of a wireless signal to a different type of wireless signal.

BRIEF DESCRIPTION OF THE DRAWINGS

FIGS. 21A-E are graphical images of wireless WSFP Devices.

FIGS. 23A-C are graphical images of SFP Devices.

DETAILED DESCRIPTION

Figure 1:
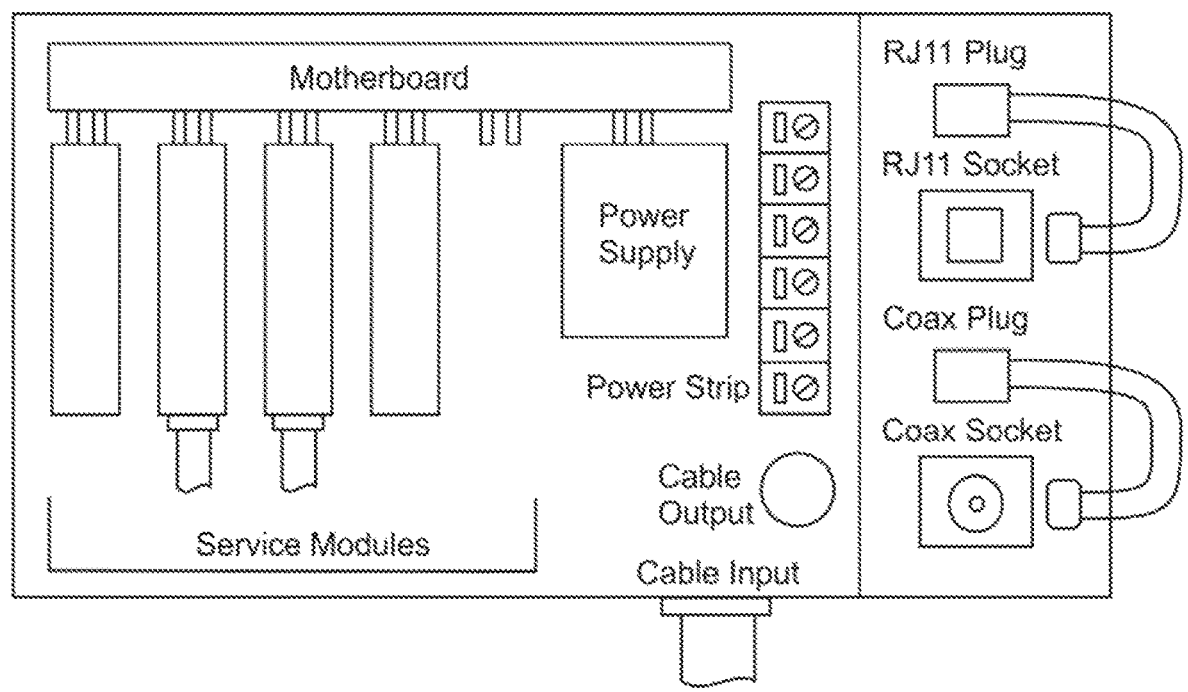
FIG. 1 is a diagram illustrating a prior art communication Demarcation Device and the use thereof for a universal Demarcation Device.
Figure 2:
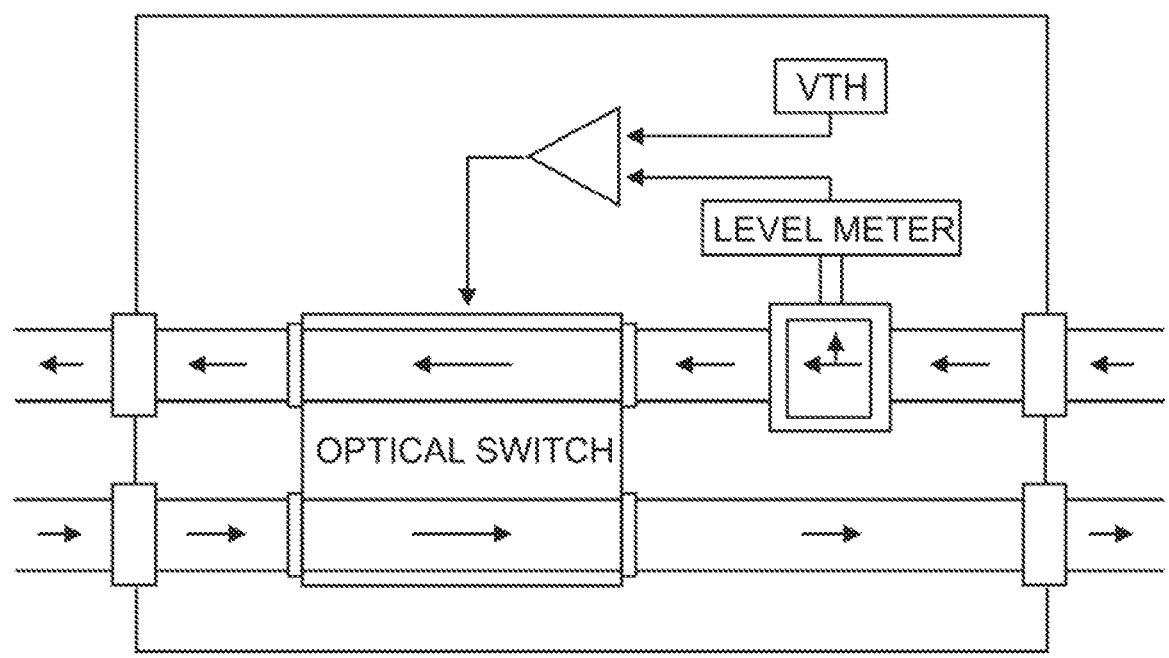
FIG. 2 is a diagram illustrating a prior art optical network Demarcation Device and the use thereof.
Figure 3:
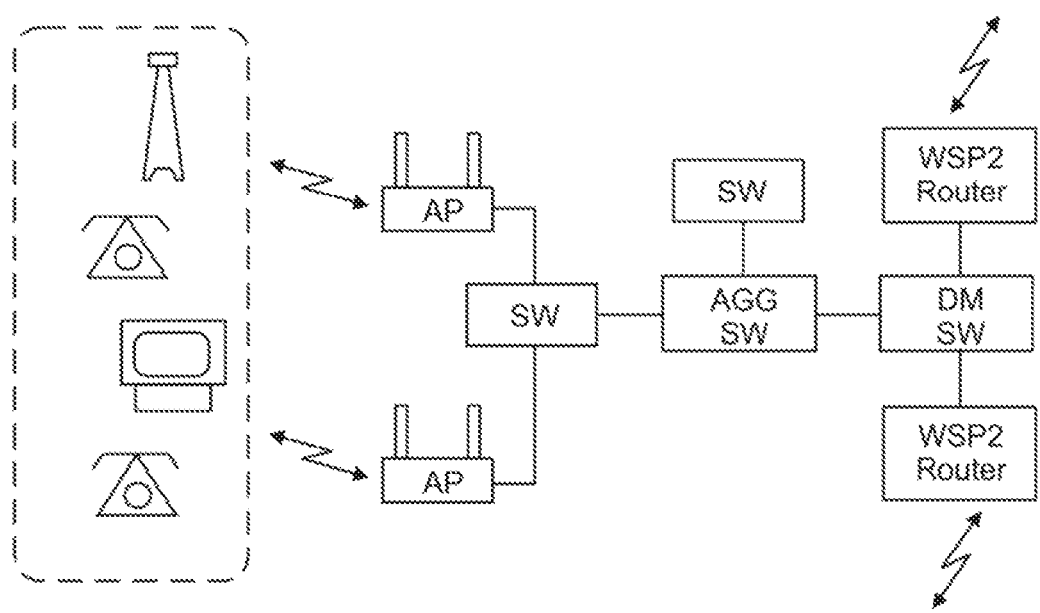
FIG. 3 is a diagram illustrating a prior art Demarcation switch and the use thereof for providing selecting wireless routers.
Figure 4:
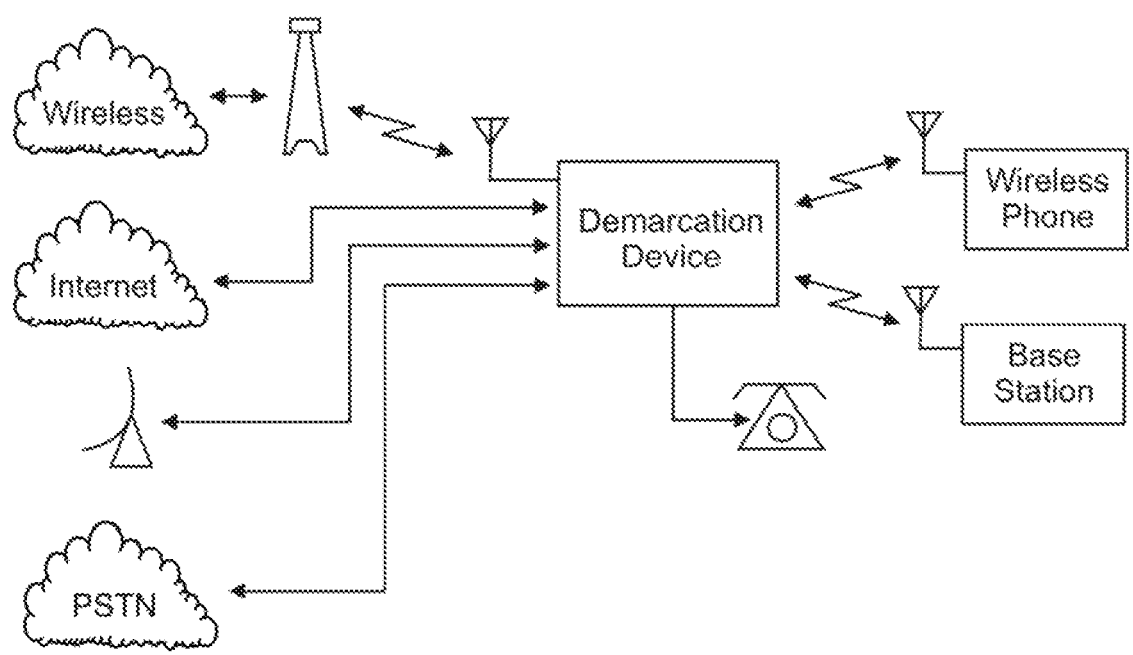
FIG. 4 is a diagram illustrating a prior art communication Demarcation Device and the use thereof for providing telecommunication services.
Figure 5:
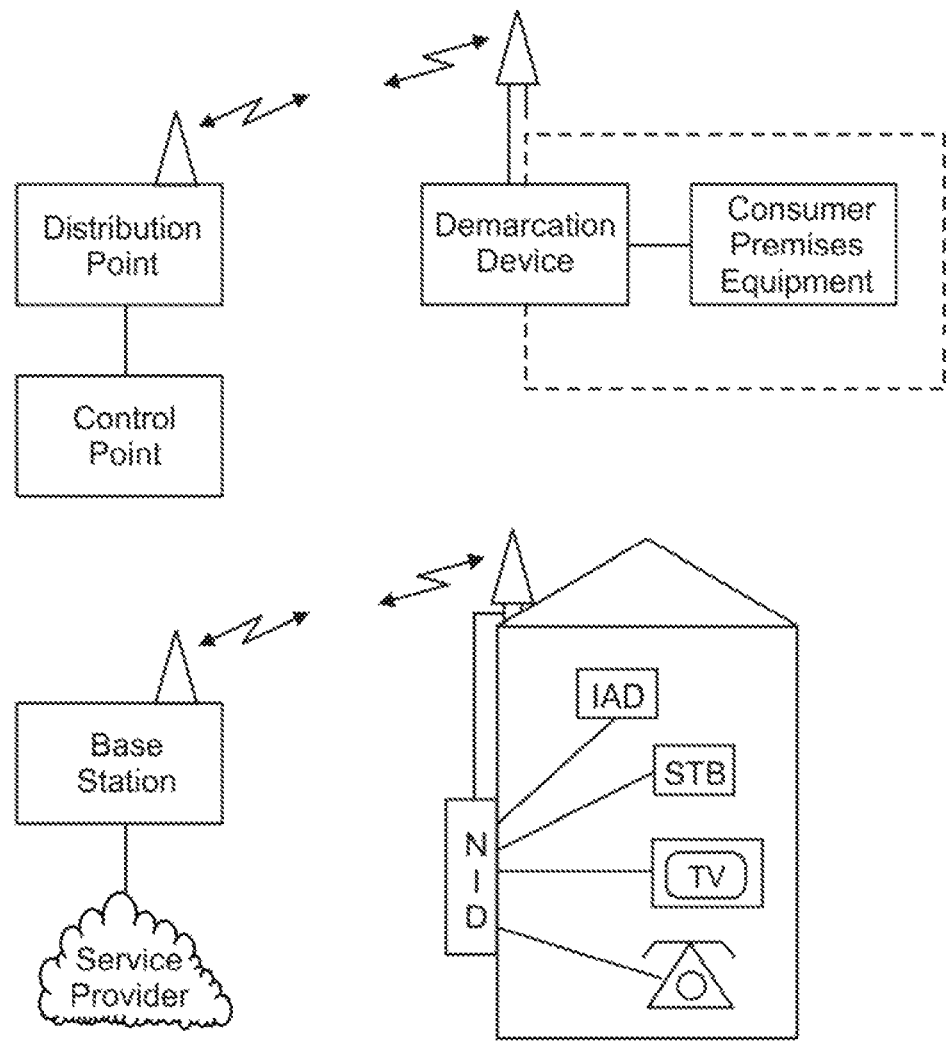
FIG. 5 is a diagram illustrating a prior art communication Demarcation Device and the use thereof for providing telecommunication services.

The methods, systems, Devices, Circuitry and equipment of the present disclosure provide numerous advantages, novel features and/or improvements in providing various communication services and associated testing and maintenance for establishing a Demarcation for communication networks, including but not limited to providing the functionality of service monitoring via wireless. Discussed below and shown in the drawings are some of these advantages, novel features and/or improvements. Additional advantages, novel features and/or improvements will become apparent to those skilled in the art upon examination of the disclosure herein and the accompanying drawings, or may be learned by production or operation of the examples.

Figure 6:
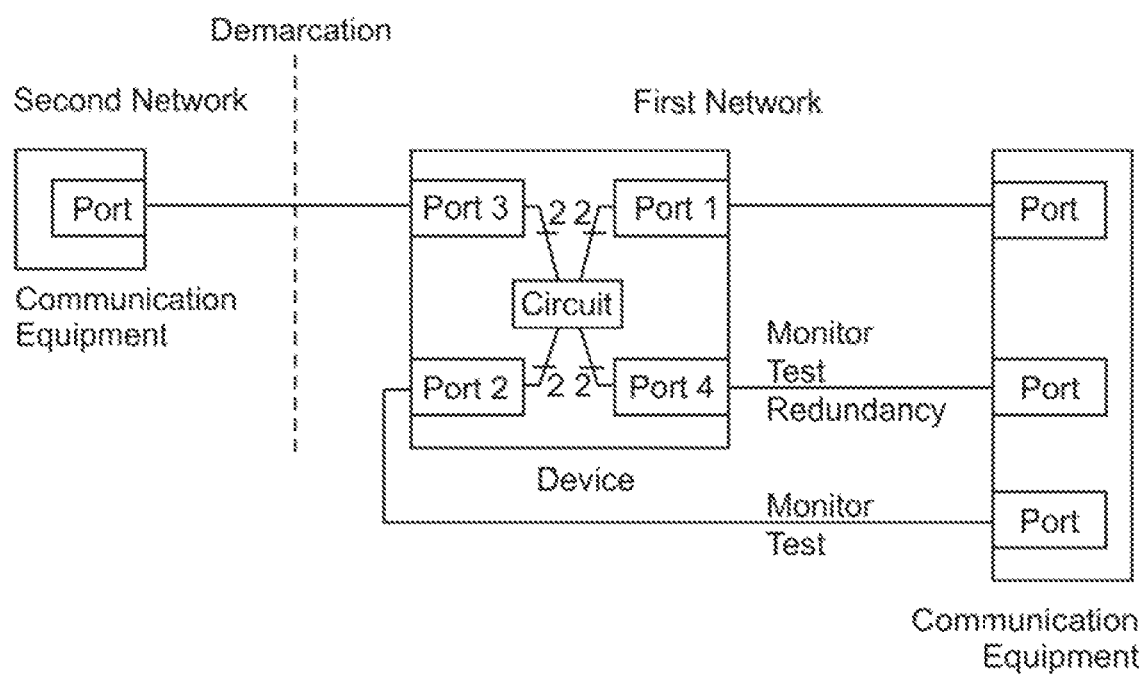
FIG. 6 is a diagram illustrating an embodiment of the Demarcation system and equipment of the present disclosure.

FIG. 6 illustrates a diagram of an embodiment of the communications system and equipment of the present disclosure. FIG. 6 illustrates a First Network comprising a communications Device having four Ports, connected to First Network Communication Equipment having three Ports, and a Second Network comprising Second Network Communication Equipment having one Port. The First Network uses the Device as a Demarcation point or line between the First Network and the Second Network connected via cabling. The Device has the ability to remotely monitor the signals by any media type (wire, fiber, wireless) through its Ports and Circuitry, discussed in more detail below. This allows the First Network to remotely Monitor and/or Test the communication service between the First and Second Networks. The First Network can also provide a Redundant path for communication service integrity. The First Network Communication Equipment can quickly and effectively troubleshoot the communication service by remote monitoring and/or testing.

Figure 7:
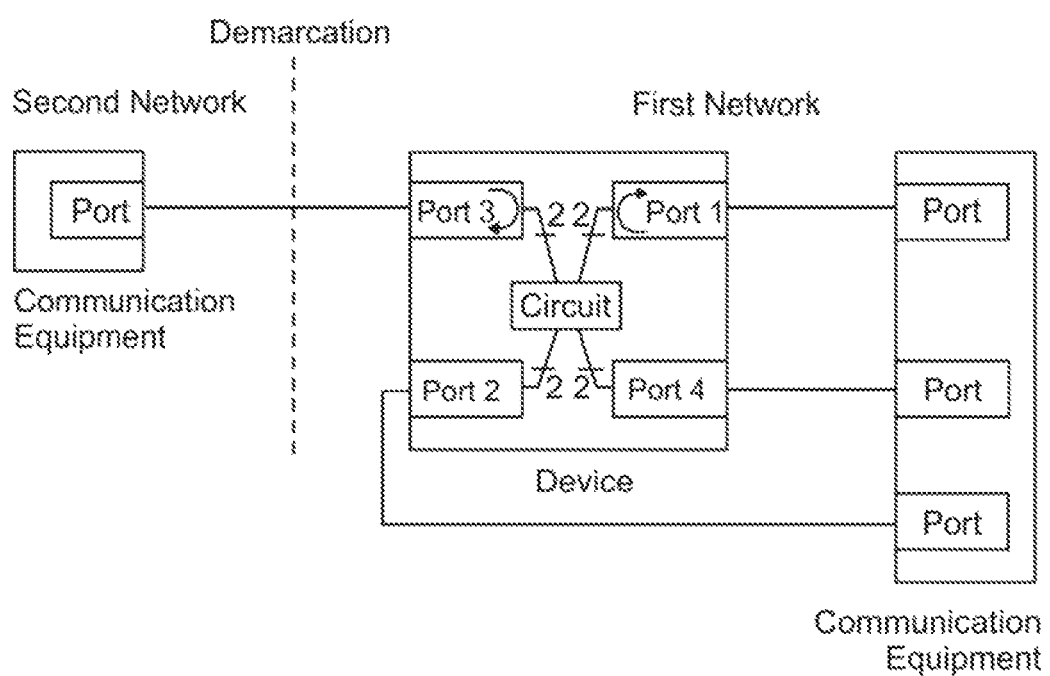
FIG. 7 is a diagram illustrating an embodiment of the Demarcation system and equipment of the present disclosure configured for loopback testing.

FIG. 7 illustrates a diagram of the embodiment of the communications system and equipment of the present disclosure, similar to FIG. 6 but in use for a different purpose. FIG. 7 still illustrates the First Network using the Device as a Demarcation point between the First and Second Networks via cabling. As illustrated in FIG. 7, the Device has the ability to loopback the communication service of the First Network, the Second Network, or both the First and Second Networks, through the its Ports and Circuitry, discussed in more detail below. Loopback testing allows the communication service to isolate faults and to perform tests at the Demarcation point.

Figure 8:
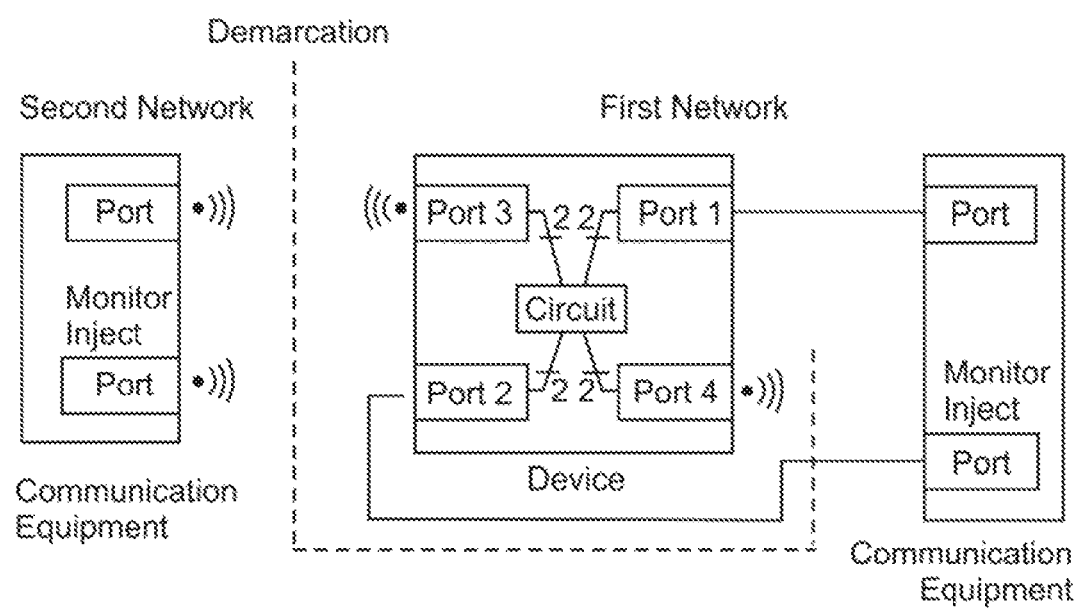
FIG. 8 is a diagram illustrating another embodiment of the Demarcation system and equipment of the present disclosure providing a Demarcation point for monitoring and/or testing.

FIG. 8 illustrates a diagram of an alternate embodiment of the communications system and equipment of the present disclosure. FIG. 8 illustrates the First Network using the Device to establish the Demarcation point between the First and Second Networks by wireless signal transmissions from Port 3 of the Device to a first Port of the Second Network, and another Demarcation point between the First and Second Networks for monitoring and/or testing the communication service of Second Network, from Port 4 of the Device to a second Port in the Second Network Communication Equipment by wireless signal transmissions. In this embodiment, the First Network can generate additional revenue by offering the Second Network the ability to monitoring and/or test communication services from the Second Network.

Figure 9:
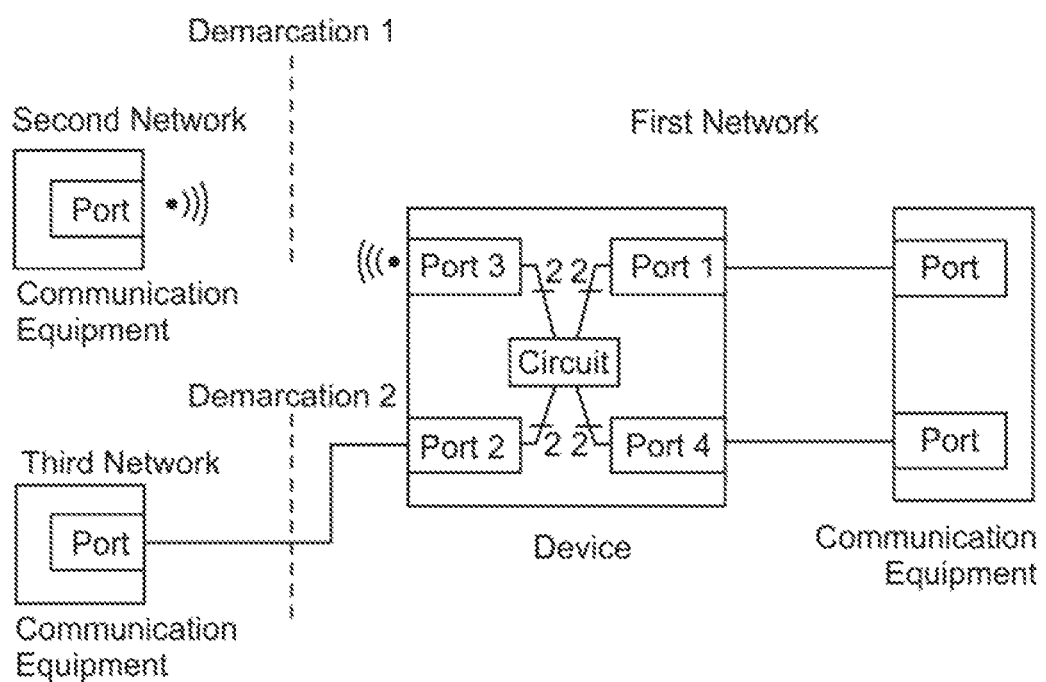
FIG. 9 is a diagram illustrating yet another embodiment of the Demarcation system and equipment of the present disclosure providing two independent Demarcation points.

FIG. 9 illustrates a diagram of another alternate embodiment of the communications system and equipment of the present disclosure. FIG. 9 illustrates the First Network enabled the On-Demand function of the Device establishing a first Demarcation point or line between the First and Second Networks by wireless signal transmissions between Port 3 of the Device and the Port of the Second Network Communication Equipment. This embodiment also establishes a second Demarcation point or line between the First Network and a Third Network having a Port and connecting to Port 2 of the Device of the First Network via cabling. In this embodiment, the First Network, while the Device is configured for monitoring the Second Network, can generate additional revenue by configuring the Device to On-Demand for the Third Network. In this manner, the First Network can offer a Third Network new communication service. Alternately, the First Network can provide another new communication service to the Second Network when the Second Network has a second Port.

Figure 10:
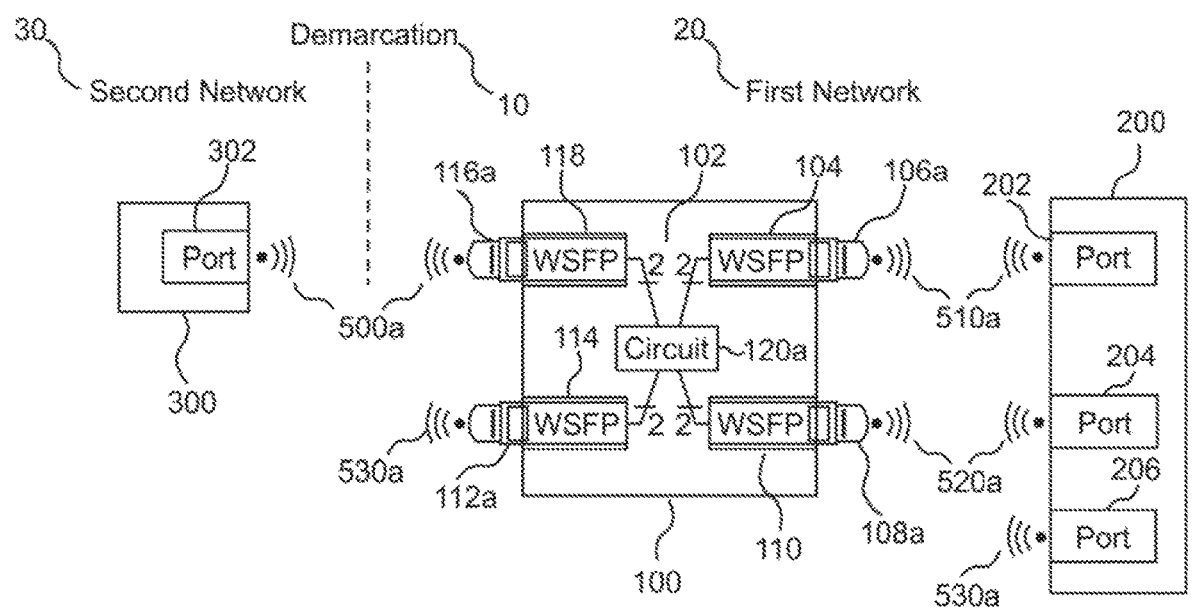
FIG. 10 is a diagram illustrating an embodiment of the Demarcation system and equipment of the present disclosure providing a wireless Demarcation point.

FIG. 10 illustrates a diagram of another alternate embodiment of the communications system and equipment of the present disclosure, wherein a Demarcation 10 is established by the First Network 20. The Demarcation Device 100 of the present disclosure establishes a Demarcation point or line 10 between a First Network 20 and a Second Network 30, specifically through a wireless SFP (WSFP) Device 116a in Port 118, in communication with a Port 302 on the Communication Equipment 300 of the Second Network 30. In this embodiment, the Device 100 provides a wireless Demarcation point or line 10 between the First Network 20 and the Second Network 30. The Device 100 provides the First Network 20 with monitoring and/or testing of the communication service. The Device 100 also provides a redundant path for the communication service of the First Network 20. The Device 100 provides a cost effective and efficient method and system for a wireless communication service Demarcation point and for the ability to wirelessly monitor and/or test communication services or provide the communication service a redundant path.

As illustrated in FIG. 10, the First Network 20 includes Communication Equipment 200 having a wireless Port 202 and two additional wireless Ports 204, 206. The wireless Ports 204, 206 of the Communication Equipment 200 provide communication service monitoring, test functions, or redundancy. The First Network 20 also includes the Device 100 having multiple Ports 104, 110, 114 and 118 as illustrated. The Device 100 has a wireless SFP (WSFP) Device 106a connected to Port 104, a WSFP Device 108a connected to Port 110, a WSFP Device 112a connected to Port 114, and a WSFP Device 116a connected to Port 118. The Device 100 also has Circuitry 120a which defines the signal paths between the Ports of the Device. The Circuitry 120a is comprised of input and output differential amplifiers connected to multiplexer switches through differential paths 102, as discussed in more detail below with respect to FIG. 24. The Second Network includes Communication Equipment 300 having a wireless Port 302.

In this embodiment, the First Network 20 establishes a Demarcation point or line 10 with Device 100 through a WSFP Device 116a. A wireless signal 500a is used to interface the communication services between the First Network 20 and the Second Network 30 through Device 100, specifically connecting the wireless signal 500a from WSFP Device 116a in Port 118 of Device 100 to the wireless Port 302 of the Communication Equipment 300 of the Second Network 30. The Device 100 in turn connects to the Communication Equipment 200 of the First Network 20 through a second wireless signal 510a, specifically connecting the WSFP Device 106a in Port 104 of Device 100 to the wireless Port 202 of the Communication Equipment 200 of First Network 20. A wireless signal 520a is used to monitor and/or test the communication services of the Second Network 30, or provide redundancy for the communication services transported by wireless signal 510a of the First Network 20, specifically connecting WSFP Device 108a to the wireless Port 204 of the Communication Equipment 200, A wireless signal 530a is used to monitor and/or test the communication service of the First Network 20, specifically connecting WSFP Device 112a to the wireless Port 206 of the Communication Equipment 200. The WSFP Devices in Ports 104, 110, 112 and 118 in this embodiment can be alternatively replaced by various other SET Devices. These other SFP Devices provide different media interfaces and connection types, e.g., wire cable, optical cable, coax cable as represented in FIGS. 21A-E and 23A-C.

Figure 11:
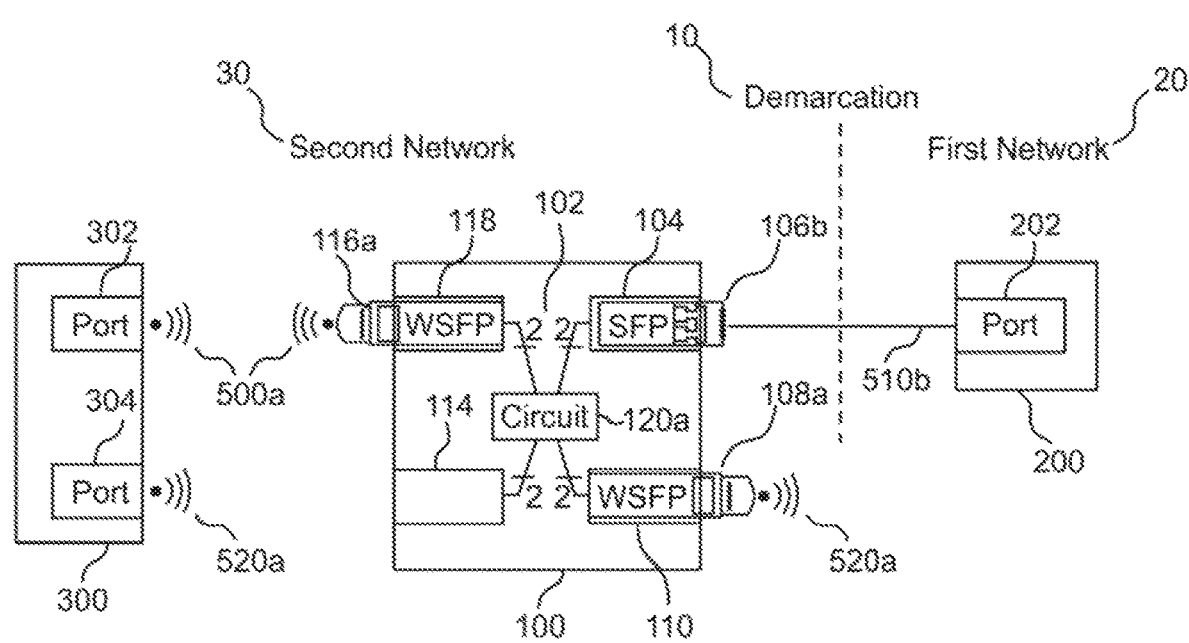
FIG. 11 is a diagram illustrating an embodiment of the Demarcation system and equipment of the present disclosure establishing a Demarcation point for a Second Network.

FIG. 11 illustrates a diagram of an embodiment of the communications system and equipment of the present disclosure, illustrating a Demarcation established by the Second Network 30, specifically through SFP Device 106b. In this embodiment, the Device 100 provides a cabling Demarcation between the First Network 20 and the Second Network 30. The Device 100 also provides the Second Network 30 with wireless monitoring and/or testing of the communication service. The Device 100 also provides a redundant path of the communication service of the Second Network. The Device 100 provides a cost effective and efficient method and system for a communication service Demarcation point and for the ability to wireless monitor and/or test communication services or provide the communication service a redundant path.

The Second Network 30 includes Communication Equipment 300 having a wireless Port 302 and an additional wireless Port 304. The wireless Port 304 of Communication Equipment 300 provides communication service monitoring, test functions, or redundancy. The Second Network 30 also includes the Device 100 having multiple Ports 104, 110, 114 and 118 as illustrated. The Device 100 has a SFP Device 106b connected to Port 104, a WSFP Device 108a connected to Port 110, a Port 114, and a WSFP Device 116a connected to Port 118. The Device 100 also has Circuitry 120a which defines the signal paths between the Ports of the Device. The Circuitry 120a is comprised of input and output differential amplifiers connected to multiplexer switches through differential paths 102, as discussed in more detail below with respect to FIG. 24.

The Second Network 30 establishes a Demarcation point or line 10 with Device 100 through SFP Device 106b. A cable 510b is used to interface the communication services between the First Network 20 and the Second Network 30 through Device 100, specifically connecting the signal from cable 510b from SFP 106b to the Port 202 of the Communication Equipment 200 of the First Network 20. The Device 100 in turn connects to the Communication Equipment 300 of the First Network 20 through a wireless signal 530a, specifically connecting the WSFP Device 106a to the wireless Port 302 of the Communication Equipment 300 of the Second Network 30. A wireless signal 520a is used to monitor and/or test the Second Network 30 communication services, or provide redundancy to the Second Network 30, specifically connecting WSFP Device 108a to the wireless Port 304 of the Communication Equipment 300. The SFP and WSFP Devices in this embodiment can be alternatively replaced by various other SFP Devices. These other SFP Devices provide different media interfaces and connection types, e.g., wire cable, optical cable, coax cable as represented in FIGS. 21A-E and 23A-C.

Figure 12:
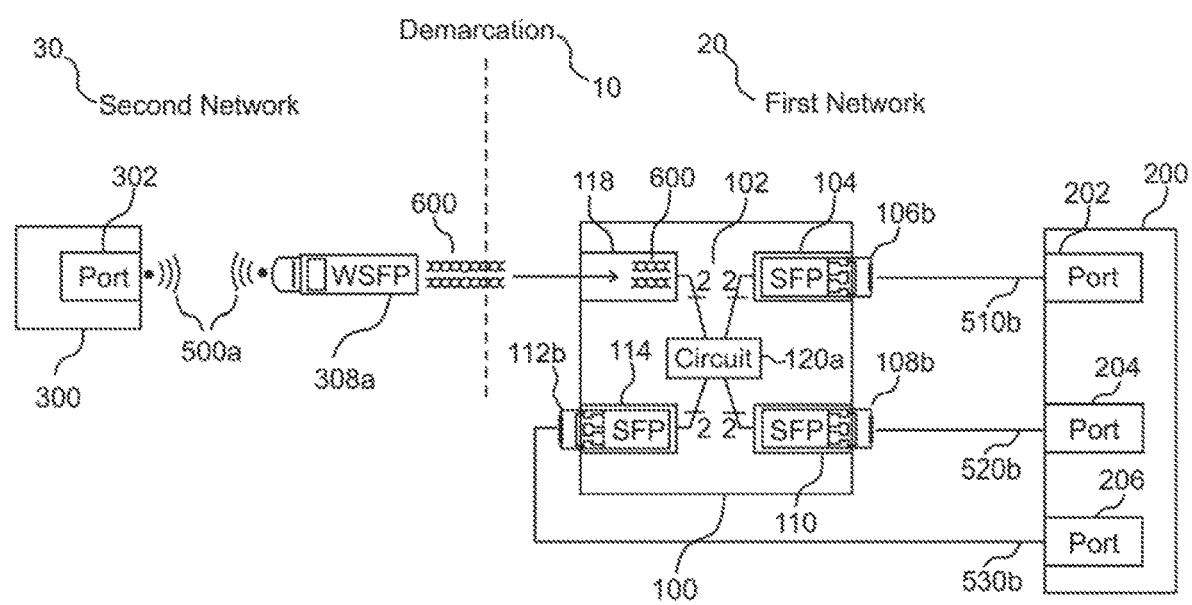
FIG. 12 is a diagram illustrating another embodiment of the wireless network Demarcation system and equipment of the present disclosure establishing a Demarcation point from the Device Port connector.

FIG. 12 illustrates a diagram of another embodiment of the communications system and equipment of the present disclosure of a Demarcation established by the First Network 20, specifically through Port 118. The Device 100 allows communication service to be transported between First and Second Networks and for the communication service to be monitored and/or injected. The Device 100 also provides a redundant path of the communication service of the First Network. In this embodiment the Device 100 provides an SFP Port Demarcation between the First and Second Networks. In this embodiment, the First Network 20 is not required to provide a SFP or WSFP Device, thereby saving the cost and responsibility of the SFP Device. The Second Network is required to provide and install the SFP or WSFP Device into Device 100 of the First Network 20. The Second Network can install the SFP or WSFP Device into Device 100 without the need to power down Device 100. The Device 100 is flexible to provide a Demarcation point or line with an SFP Port or an SFP Device.

The First Network 20 includes Communication Equipment 200 having a Port 202 and two additional Ports 204, 206. Port 204 of Communication Equipment 200 provides communication service monitoring, test functions, or redundancy. Port 206 of the Communication Equipment 200 provides communication service monitoring or test functions. The First Network 20 also includes the Device 100 having multiple Ports 104, 110, 114 and 118 as illustrated. The Device 100 has a SFP Device 106b connected to SFP Port 104, a SFP Device 108b connected to SFP Port 110, a SFP Device 112b connected to SFP Port 114, and a SFP Port 118. The Device 100 also has Circuitry 120a which defines the signal paths between the Ports of the Device. The Circuitry 120a is comprised of input and output differential amplifiers connected to multiplexer switches through differential paths 102, as discussed in more detail below with respect to FIG. 24. The Second Network 30 includes Communication Equipment 300 having a wireless Port 302 and a WSFP Device 308a, which is to be placed into Port 118 of the Device 100.

The First Network 20 establishes a Demarcation point 10 with Device 100 through SFP Port 118. The WSFP Device 308a is used to interface the communication services between the First Network 20 and the Second Network 30, specifically interfacing the wireless signal 500a from wireless Port 302 of the Communication Equipment 300 of the Second Network 30. The WSFP Device 308a in turn interfaces differential signals 600 to the SFP Port 118 of Device 100 of the First Network 20. The Device 100 in turn connects to the Communication Equipment 200 of the First Network 20 through a cable 510b, specifically connecting the SFP 106b to Port 202 of the Communication Equipment 200 of First Network 10. A cable 520b is used to monitor and/or test the communication services of the Second Network 30, or provide redundancy for the communication services transported by signal 510b of the First Network 20, specifically connecting SFP Device 108b to Port 204 of the Communication Equipment 200. A cable 530b is used to monitor and/or test the communication services of the First Network 20, specifically connecting SFP Device 112b to Port 206 of the Communication Equipment 200. The SFP and WSFP Devices in this embodiment can be alternatively replaced by various other SFP Devices. These other SFP Devices provide different media interfaces and connection types, e.g., wire cable, optical cable, coax cable, and wireless as represented in FIGS. 21A-E and 23A-C.

Figure 13:
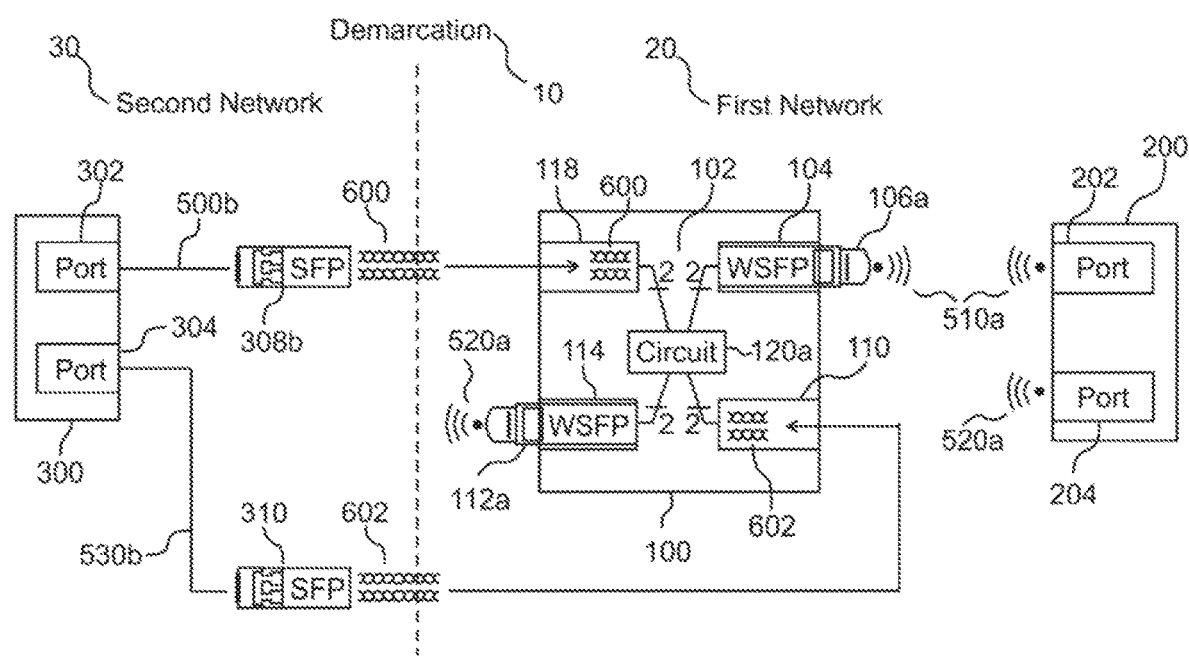
FIG. 13 is a diagram illustrating another embodiment of the wireless network Demarcation system and equipment of the present disclosure establishing a Demarcation point from the Device Port connector and monitor Port connector.

FIG. 13 illustrates a diagram of still another embodiment of the communications system and equipment of the present disclosure of a Demarcation 10 established by the First Network 20, specifically through SFP Port 118 and SFP Port 110 coextensively. In this embodiment the Device 100 provides a SFP Port Demarcation of communication service between the First and Second Networks, and an SFP Port Demarcation of monitoring and/or testing. In this embodiment, the First Network 20 is not required to provide SFP or WSFP Devices, thereby saving costs. The First Network 20 can also provide the Second Network 30 a Demarcation point or line for monitoring and/or testing its communication services. The First Network 20 can increase revenue by offering this benefit. In this embodiment, the Second Network 30 is required to provide and install each SFP or WSFP Device for transport and/or monitoring into Device 100 of the First Network 20, The Second Network 30 can install each SFP or WSFP Device into Device 100 without the need to power down Device 100. The Device 100 is flexible to provide a transport and monitoring Demarcation point or line with an SFP Port or an SFP Device.

The First Network 20 includes Communication Equipment 200 having a Port 202 and an additional Port 204. Port 204 of the Communication Equipment 200 provides communication service monitor and/or test functions. The First Network 20 also includes the Device 100 having multiple Ports 104, 110, 114 and 118 as illustrated. The Device 100 has a WSFP Device 106a connected to SFP Port 104, an SFP Port 110, a WSFP Device 112a connected to SFP Port 114, and a SFP Port 118. The Device 100 also has Circuitry 120a which defines the signal paths between the Ports of the Device. The Circuitry 120a is comprised of input and output differential amplifiers connected to multiplexer switches through differential paths 102, as discussed in more detail below with respect to FIG. 24. The Second Network 30 includes Communication Equipment 300 having Port 302 and 304, and SFP Device 308b and SFP Device 310, which are to be placed into Port 118 and Port 110 of the Device 100, respectively.

The First Network 20 establishes a Demarcation point or line 10 with Device 100 through SFP Port 118. The SFP Device 308b is used to interface the communication service between the First Network 20 and the Second Network 30, specifically interfacing the signal on cable 500b from Port 302 of the Communication Equipment 300 of the Second Network 30. The SFP Device 308b in turn interfaces differential signals 600 to the SFP Port 118 of Device 100 of the First Network 20. The Device 100 in turn connects to the Communication Equipment 200 of the First Network 20 through a wireless signal 510a, specifically connecting the WSFP Device 106a to the Port 202 of the Communication Equipment 200 of First Network 20. A third signal 520a is used to monitor and/or test the communication services of the Second Network 30, specifically connecting WSFP Device 112a to Port 204 of the Communication Equipment 200 of the First Network 20.

Additionally, the First Network 20 establishes a Demarcation monitoring or testing point or line with Device 100 through SFP Port 110. This Demarcation point or line is coextensive with Demarcation point or line 10. A cable 530b is used to monitor and/or test the communication services of the First Network 20, specifically connecting SFP Device 310 to Port 304 of the Communication Equipment 300 of the Second Network 30. The SFP Device 310 in him interfaces differential signals 602 to the SFP Port 110 of Device 100 of the First Network 20. The SFP and WSFP Devices in this embodiment can be alternatively replaced by various other SFP Devices. These other SFP Devices provide different media interfaces and connection types, e.g., wire cable, optical cable, coax cable, and wireless as represented in FIGS. 21A-E and 23A-C.

Figure 14:
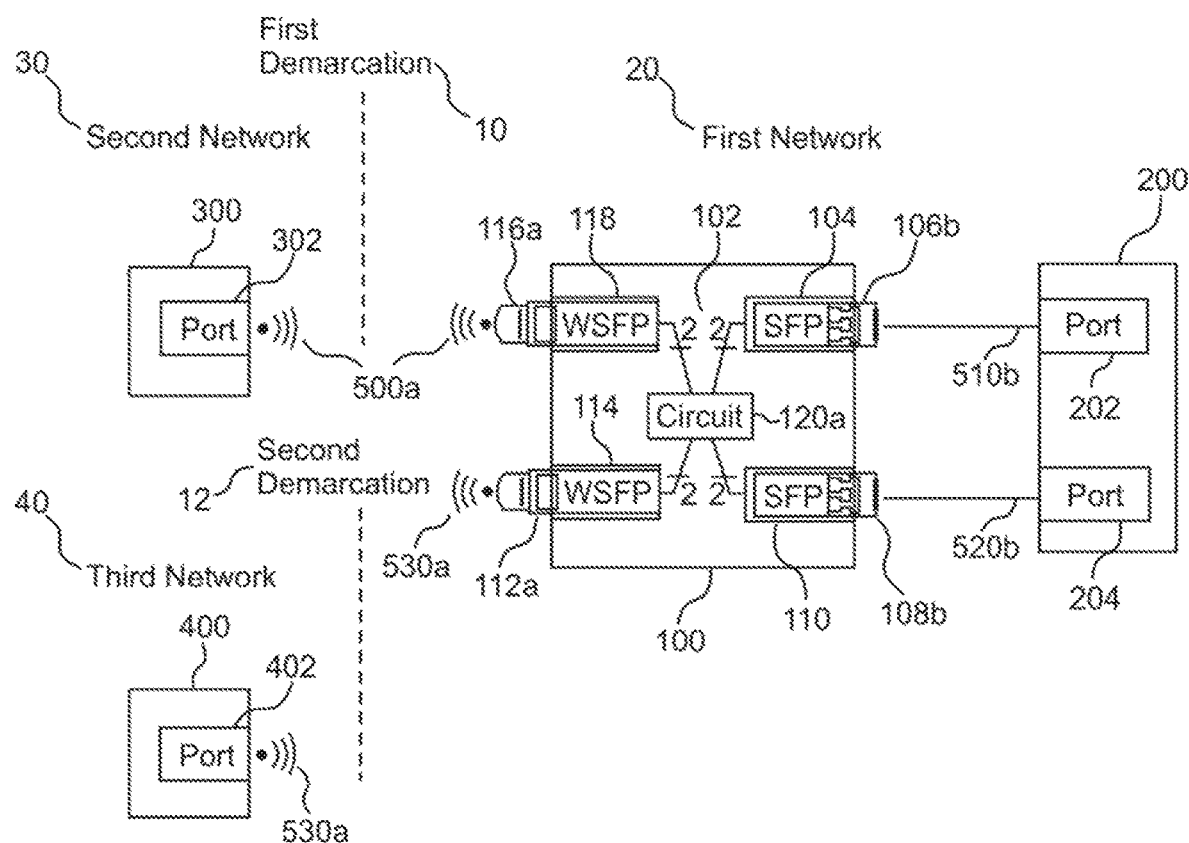
FIG. 14 is a diagram illustrating another embodiment of the Demarcation system and equipment of the present disclosure establishing two independent Demarcation points from separate communication services and cabling facilities.

FIG. 14 illustrates a diagram of still another embodiment of the communications system and equipment of the present disclosure of a First Demarcation and a Second Demarcation established by the First Network 20. The Demarcation Device 100 of this embodiment establishes two Demarcation points or lines 10 and 12. A First Demarcation 10 is established between a First Network 20 and a Second Network 30, specifically through WSFP Device 116a. A Second Demarcation 12 is established between a First Network 20 and a Third Network 40, specifically through WSFP Device 112a. The Device 100 allows a first communication service to be transported between First and Second Networks and a second communication service to be transported between First and Third Networks. In this embodiment the Device 100 provides on-demand services to provide a Second Demarcation point or line 12 between the First and Third Networks. The Second Demarcation point or line 12 can alternatively be established between the First and Second Networks when the Communication Equipment 300 of the Second Network 30 has a second Port.

The First Network 20 includes Communication Equipment 200 having a Port 202 and an additional Port 204. The First Network 20 also includes the Device 100 having multiple Ports 104, 110, 114 and 118 as illustrated. The Device 100 has a SFP Device 106b connected to SFP Port 104, a SFP Device 108b connected to SFP Port 110, a WSFP Device 112a connected to SFP Port 114, and a WSFP Device 116a connected to SFP Port 118. The Device 100 also has Circuitry 120a which defines the signal paths between the Ports of the Device. The Circuitry 120a is comprised of input and output differential amplifiers connected to multiplexer switches through differential paths 102, as discussed in more detail below with respect to FIG. 24. The Second Network 30 includes Communication Equipment 300 having a wireless Port 302. The Third Network 40 includes Communication Equipment 400 having a wireless Port 402.

The First Network 20 establishes two Demarcation points or lines with Device 100 through WSFP Device 112a and WSFP Device 116a. The WSFP Device 116a is used to interface the communication services between the First Network 20 and Second Network 30 thereby establishing a First Demarcation point or line 10. Specifically the WSFP Device 116a interfaces the wireless signal 500a from Port 302 of the Communication Equipment 300 of the Second Network 30. The Device 100 in turn connects to the Communication Equipment 200 of the First Network 20 through a cable 510b, specifically connecting the SFP 104 to the Port 202 of the Communication Equipment 200 of First Network 10.

The WSFP Device 112a is used to interface the communication services between a First Network 20 and a Third Network 40 thereby establishing a Second Demarcation point 12. Specifically the WSFP Device 112a interfaces the wireless signal 530a from Port 402 of the Communication Equipment 400 of the Third Network 40. The Device 100 in turn connects to the Communication Equipment 200 of the First Network 20 through a cable 520b, specifically connecting the SFP 108 to the Port 204 of the Communication Equipment 200 of First Network 10. The SFP and WSFP Devices in this embodiment can be alternatively replaced by various other SFP Devices. These other SFP Devices provide different media interfaces and connection types, e.g., wire cable, optical cable, coax cable, and wireless as represented in FIGS. 21A-E and 23A-C.

Figure 15:
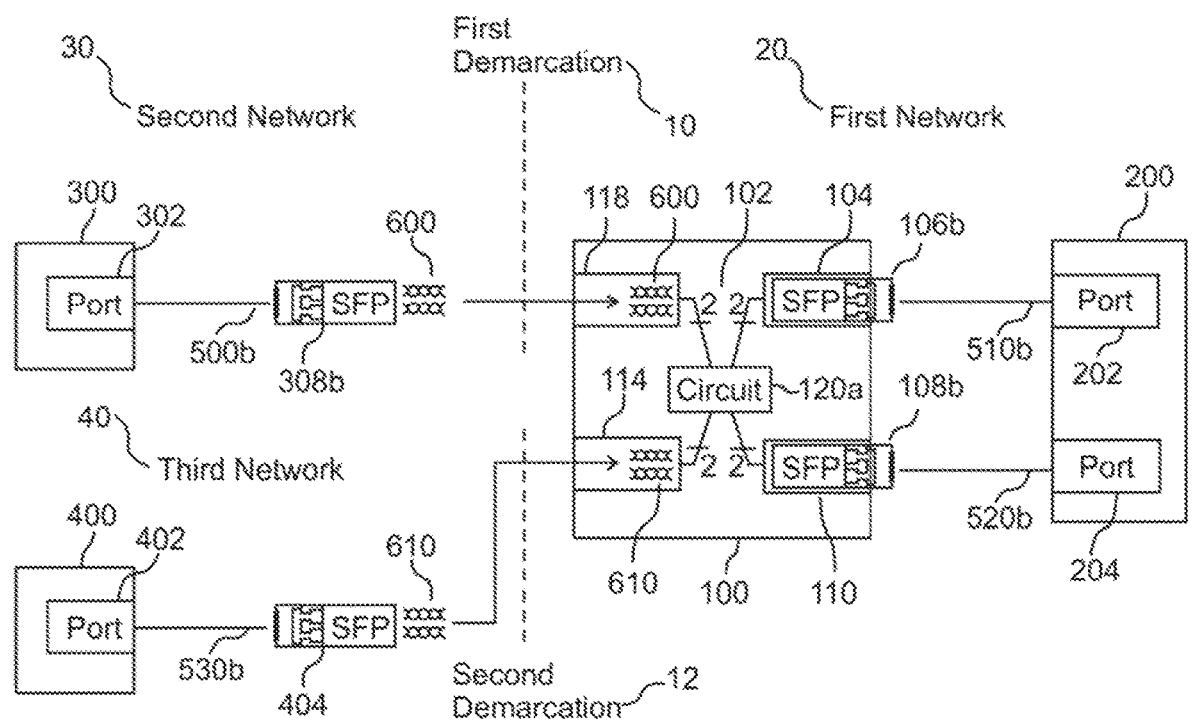
FIG. 15 is a diagram illustrating another embodiment of the Demarcation system and equipment of the present disclosure establishing two independent Demarcation points from the Device Port connectors from separate communication services and cabling facilities.

FIG. 15 illustrates a diagram of still yet another embodiment of the communications system and equipment of the present disclosure of a First and Second Demarcation established by the First Network 20. The Demarcation Device 100 of this embodiment establishes two Demarcation points or lines 10 and 12. A First Demarcation 10 is established between a First Network 20 and a Second Network 30, specifically through SFP Port 118. A Second Demarcation 12 is established between a First Network 20 and a Third Network 40, specifically through SFP Port 114. The Device 100 allows a communication service to be transported between First and Second Networks, and another communication service to be transported between First and Third Networks. In this embodiment, the Device 100 provides on-demand services to provide a Second Demarcation point or line 12 with SFP Ports between the First and Third Networks. The Second Demarcation point 12 with SFP Ports can alternatively be established between the First and Second Network when the Communication Equipment 300 of the Second Network 30 has a second Port. In this embodiment, the First Network 20 is not required to provide SFP or WSFP Devices, thereby saving costs. The Second and Third Networks are required to provide and install their respective SFP or WSFP Device into Device 100 of the First Network 20. The Second and Third Networks can install their respective SFP or WSFP Device into Device 100 without the need to power down Device 100. The Device 100 is flexible to provide a Demarcation point with an SFP Port or an SFP Device.

The First Network 20 includes Communication Equipment 200 having a Port 202 and an additional Port 204. The First Network 20 also includes the Device 100 having multiple Ports 104, 110, 114 and 118 as illustrated. The Device 100 has a SFP Device 106b connected to SFP Port 104, a SFP Device 108b connected to SFP Port 110, an SFP Port 114, and an SFP Port 118. The Device 100 also has Circuitry 120a which defines the signal paths between the Ports of the Device. The Circuitry 120a is comprised of input and output differential amplifiers connected to multiplexer switches through differential paths 102, as discussed in more detail below with respect to FIG. 24. The Second Network 30 includes Communication Equipment 300 having a Port 302, and a SFP Device 308b. The Third Network 40 includes Communication Equipment 400 having a Port 402, and a SFP Device 404.

The First Network 20 establishes two Demarcation points or lines with Device 100 through SFP Port 114 and SFP Port 118, respectively. The SFP Device 308b is used to interface the communication services between the First Network 20 and the Second Network 30 thereby establishing a first Demarcation point 10, specifically interfacing the signal on cable 500b from Port 302 of the Communication Equipment 300 of the Second Network 30. The SFP Device 308b in turn interfaces differential signals 600 to the SFP Port 118 of Device 100 of the First Network 20. The Device 100 in turn connects to the Communication Equipment 200 of the First Network 20 through a cable 510b, specifically connecting the SFP 106 to the Port 202 of the Communication Equipment 200 of First Network 10.

The SFP Device 404 is used to interface the communication services between a First Network 20 and a Third Network 40 thereby establishing a Second Demarcation point or line 12, specifically interfacing the signal from cable 530b from Port 402 of the Communication Equipment 400 of the Third Network 40. The SFP Device 404 in turn interfaces differential signals 610 to the SFP Port 114 of Device 100 of the First Network 20. The Device 100 in turn connects to the Communication Equipment 200 of the First Network 20 through cable 520b, specifically connecting the SFP 108 to the Port 204 of the Communication Equipment 200 of First Network 10. The SFP Devices in this embodiment can be alternatively replaced by various other SFP and WSFP Devices. These other SFP Devices provide different media interfaces and connection types, e.g., wire cable, optical cable, coax cable, and wireless as represented in FIGS. 21A-E and 23A-C.

Figure 16:
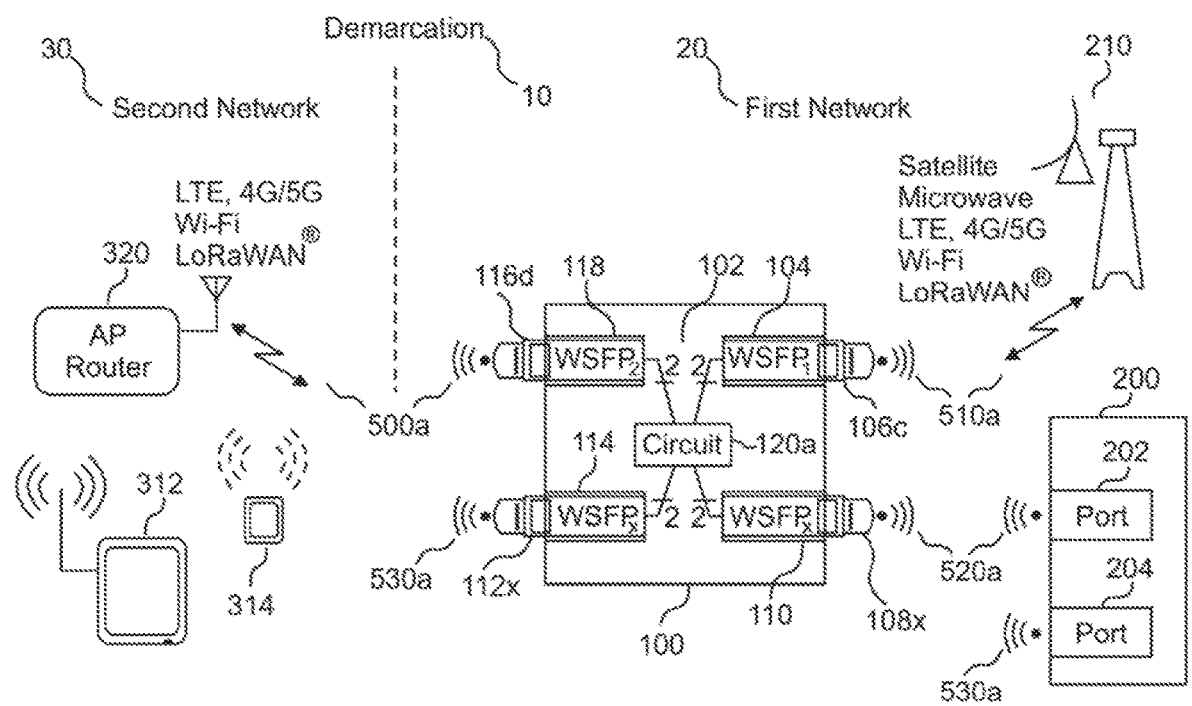
FIG. 16 is a diagram illustrating embodiment of the Demarcation system and equipment of the present disclosure functioning as a wireless signal converter.

FIG. 16 illustrates a diagram of still another embodiment of the communications system and equipment of the present disclosure of a Demarcation established by the First Network 20. The Demarcation Device 100 of this embodiment establishes a Demarcation point or line 10 between a First Network 20 and a Second Network 30, specifically through a wireless SFP (WSFP$_2$) Device 116d. The Device 100 allows communication service to be transported between First and Second Networks and for the communication service to be monitored and/or injected. The Device 100 also allows the conversion of a wireless signal to another type of wireless signal. At the Demarcation point or line 10, the wireless signal type from the First Network 20 can be different than the wireless signal type of the Second Network 30. A service provider network will typically use a wireless signal for wide area network or long reach applications, such as direct wireless, satellite, microwave, or cellular services LTE, IMT-2000 (4G) and IMT-2020 (5G). The end-user will typically use wireless signals for smaller network application such as IEEE 802.11a, b, g, n, ac, ax (Wi-Fi) signal IEEE 802.15, Bluetooth wireless signals, IMT-2000 (4G), IMT-2020 (5G), and LoRa® and LoRaWAN® (trademarks of Semtech), or in combinations with other Internet of Things (IoT) wireless signals (Bluetooth, Zigbee, Lora, etc.). The wireless signal conversion can also apply for application where a specific wireless signal is better suited for a network or network applications due to wireless spectrum mapping, wireless signal reliability, cost, and security. An example of a wireless SFP (WSFP) Device is illustrated in FIG. 21 and described in my U.S. Pat. No. 10,446,909 B2 entitled Small Form Factor Pluggable Unit with Wireless Capabilities, issued on Oct. 15, 2019, the entire disclosure of which is incorporated herein by reference. The Device 100 will provide a wireless signal type conversion between networks at the Demarcation point or line 10. The Device 100 will also provide a wireless signal type conversion for monitoring and/or testing.

The First Network 20 includes a Wireless Tower or Satellite Dish 210 and a Communication Equipment 200 having a wireless Port 202 and two additional wireless Ports 204, 206. The wireless Ports 204, 206 of the Communication Equipment 200 provide communication service monitor and/or test functions. The First Network 20 also includes the Device 100 having multiple Ports 104, 110, 114 and 118 as illustrated. The Device 100 has a wireless SFP defined with a wireless signal type 1 (WSFP$_1$) Device 106c connected to SFP Port 104, a wireless SFP defined with a wireless signal (WSFPx) Device 108x connected to SFP Port 110, a WSFPx Device 112x connected to SFP Port 114, and a wireless SFP defined with a wireless signal type 2 (WSFP$_2$) Device 116d connected to SFP Port 118. The WSFPx can be any wireless signal type selected by the network. The Device 100 also has Circuitry 120a which defines the signal paths between the Ports of the Device. The Circuitry 120a is comprised of input and output differential amplifiers connected to multiplexer switches through differential paths 102, as discussed in more detail below with respect to FIG. 24. The Second Network 30 includes Communication Equipment represented as a wireless Access Point (AP) Router 320 distributing communication services from wireless signal 500a to a Wireless Internet of Things (IoT) Device 312 and a Smart Phone 314. The WSFP Devices can be alternatively replaced by various other SFP Devices to provide other types of physical media conversions such as a 10G LC Fiber SFP Device connected to SFP Port 104 and a WSFP$_2$ Device 116d or a 10GBase-T RJ45 SFP Device connected to SFP Port 118. SFP Port 110 and SFP Port 114 can also support any SFP or WSFP Devices. These other SFP Devices provide different media interfaces and connection types, e.g., wire cable, optical cable, coax cable as represented in FIGS. 21A-E and 23A-C.

The First Network 20 establishes a Demarcation point or line 10 with Device 100 through a WSFP$_2$ Device 116d. A wireless signal 500a is used to interface the communication services between a First Network 20 and a Second Network 30 through Device 100, specifically connecting the wireless signal 500a from WSFP$_2$ Device 116d to the AP Router 320 of the Second Network 30. The Device 100 in turn connects to the Communication Equipment 200 of the First Network 20 through a second wireless signal 510a, specifically connecting the WSFP$_1$ Device 106d to the wireless Port 202 of the Communication Equipment 200 of First Network 10. A wireless signal 520a is used to monitor and/or test the communication services of the Second Network 30, specifically connecting WSFPx Device 108x to the wireless Port 204 of the Communication Equipment 200. A wireless signal 530a is used to monitor and/or test the communication services of the First Network 20, specifically connecting WSFPx Device 112x to the wireless Port 206 of the Communication Equipment 200. WSFPx Devices can be any type of wireless SFP devices.

Figure 17:
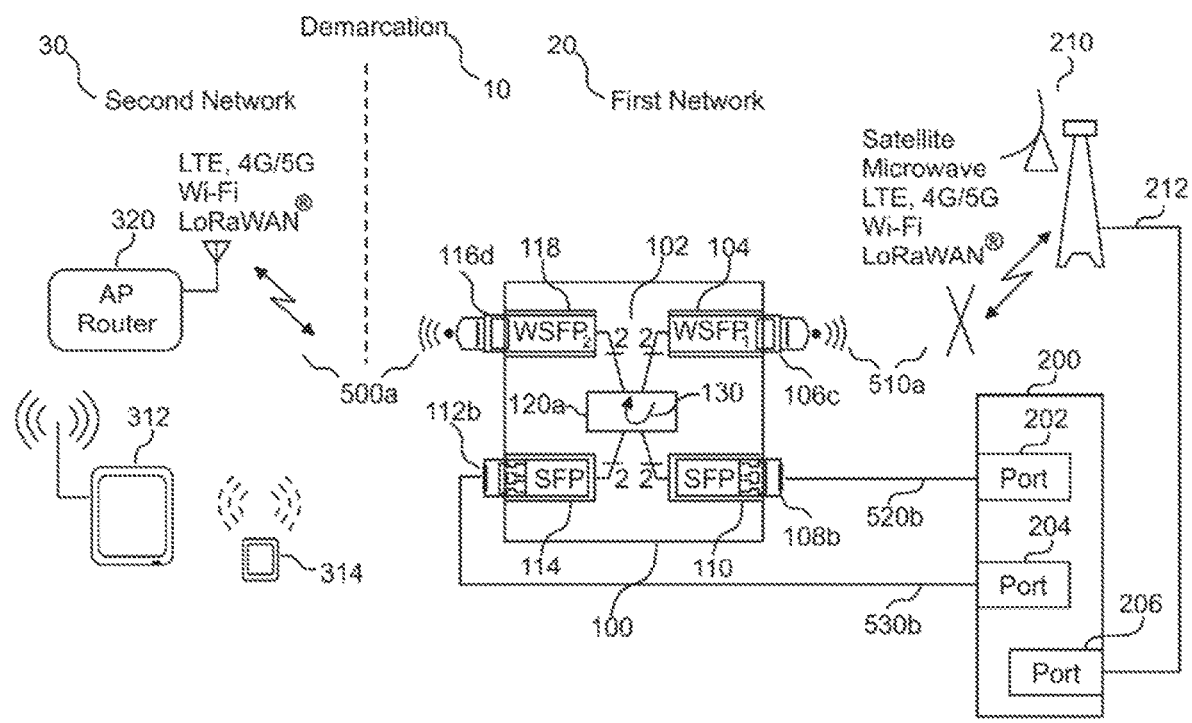
FIG. 17 is a diagram illustrating another embodiment of the Demarcation system and equipment of the present disclosure functioning as a wireless signal converter in redundancy configuration.

FIG. 17 illustrates a diagram of still another embodiment of the communications system and equipment of the present disclosure of a Demarcation established by the First Network 20, comprising a Wireless Tower or Satellite Dish 210, a Communication Equipment 200, and Demarcation Device 100. The Demarcation Device 100 of this embodiment establishes a Demarcation point or line 10 between a First Network 20 and a Second Network 30, specifically through a wireless SFP (WSFP$_2$) Device 116d. The Device 100 allows a redundant communication service to be transported between First and Second Networks, and for a disabled communication service to be monitored and/or injected by any physical media type. The Device 100 also allows the conversion of a wireless signal to another type or format of the wireless signal. The Device 100 as a wireless converter will perform a wireless-to-electrical-to-wireless signal conversion using the wireless SFP (WSFP) devices. The Device 100 is configured in a redundant operation due to the disruption of the wireless signal between the Wireless Tower or Satellite Dish 210 of the First Network 20 and the Device 100.

At the Demarcation point or line 10, the wireless signal type from the First Network 20 can be different than the wireless signal type of the Second Network 30. A service provider network will typically use a wireless signal for wide area network or long reach application, such as direct wireless, satellite, microwave, or cellular services LTE, IMT-2000 (4G) and IMT-2020 (5G). The end-user will typically use wireless signals for focused or end-user network application such as IEEE 802.11a, b, g, n, ac, ax (Wi-Fi) signal, IEEE 802.15, Bluetooth wireless signals, IMT-2000 (4G), IMT-2020 (5G), and LoRa® and LoRaWAN® (trademarks of Semtech), or in combinations with other IoT wireless signals (Bluetooth, Zigbee, Lora, etc.). The wireless signal converter can also be used for application where a specific wireless signal is better suited for a network or network applications due to wireless spectrum mapping, wireless signal reliability, and costs. An example of a wireless WSFP Device is illustrated in FIG. 21 and described in U.S. Pat. No. 10,446,909 B2, incorporated herein by reference. The Device 100 will provide a wireless signal type conversion between networks at the Demarcation point or line 10, a wireless signal type conversion for monitoring and/or testing, and communication service redundancy.

The First Network 20 includes a Wireless Tower or Satellite Dish 210 and a Communication Equipment 200 having Ports 202, 204, and 206. Port 202 of the Communication Equipment 200 provides the redundant communication service of the wireless signal 510a to Device 100. Port 204 of the Communication Equipment 200 provides communication service monitoring and testing of the wireless communication service 510a of the First Network 20. Port 206 of the Communication Equipment 200 provides the redundant communication service of the Wireless Tower 210. If the wireless signal 510a becomes impaired or disrupted, as represented by the "X" in FIG. 17, the Device 100 Port 110 will route the redundant communication service of Cable 520b by means of Device 100 Circuitry 120 to the wireless signal WSFP$_2$ Device 116d.

The First Network 20 also includes the Device 100 having multiple Ports 104, 110, 114 and 118 as illustrated. The Device 100 has a wireless SFP defined with a wireless signal type 1 SFP (WSFP$_1$) Device 106c connected to SFP Port 104, a SFP Device 108b, connected to SFP Port 110, a SFP Device 112b connected to SFP Port 114, and a wireless SFP defined with a wireless signal type 2 SFP (WSFP$_2$) Device 116d connected to SFP Port 118. The Device 100 with the WSFP$_1$ Device 106c and WSFP$_2$ Device 116d provide the wireless signal conversion. The Device 100 also has Circuitry 120a which defines the signal paths between the Ports of the Device. The Circuitry 120a is comprised of input and output differential amplifiers connected to multiplexer switches through differential paths 102, as discussed in more detail below with respect to FIG. 24. The Second Network 30 includes communication equipment represented as a Wireless Router 320 distributing the communication services 500a to a Wireless IoT Device 312 and a Smart Phone 314. The WSFP Devices can be alternatively replaced by various other SFP Devices to provide other types of physical media conversions, such as a 10G LC Fiber SFP Device connected to SFP Port 104 and a WSFP Device or a 100Base-T RJ45 SFP Device connected to SFP Port 118. SFP Port 110 and SFP Port 114 can also support any SFP or WSFP devices. These other SFP Devices with different media interfaces and connection types, e.g., wire cable, optical cable, coax cable are illustrated in FIGS. 21A-E and 23A-C.

A cable 520b is used as the redundant or mirrored communication service of wireless signal 510a. A cable 530b is used to monitor communication services of the First Network 20. The Device 100 will manually or automatically configure to a redundancy operation upon quality degradation or disruption to the wireless signal 510a or failure of the WSFP$_1$ Device 106c. The Device 100 configured in a redundancy operation will connect the First Network 20 and a Second Network 30 through Device 100, specifically connecting the wireless signal 500a from WSFP$_2$ Device 116d to the Wireless Router 320 of the Second Network 30. The Device 100 in turn connects to the Communication Equipment 200 Port 202 of the First Network 20 through a cable 520b, specifically connecting the SFP device 108b.

The Communication Equipment 200 Port 204 cable 530b monitors the wireless signal 510a received from SFP Device 112b to evaluate and determine if the receive communication path from the Wireless Tower 210 to the WSFP$_1$ Device 106c is functional or operational. The Communication Equipment 200 Port 204 can then inject signals into cable 530b for testing the wireless signal 510a transmit path from the WSFP$_1$ Device 106c to the Wireless Tower 210. The Device 100 can initiate a signal loopback via the communication path 130 of Circuit 120 to further test and isolate the wireless signal 510a and the WSFP$_1$ Device 106c. When the First Network 20 re-establishes the operation of the wireless signal 510a, the Device 100 can re-configure back to normal operation, specifically connecting the wireless signal 500a from WSFP$_2$ Device 116d to the Wireless Router 320 of the Second Network 30. The Device 100 in turn connects to the Wireless Tower 210 of the First Network 20 through a wireless signal 510a, specifically connecting the WSFP$_1$ 106c to the SFP Port 104.

Figure 18:
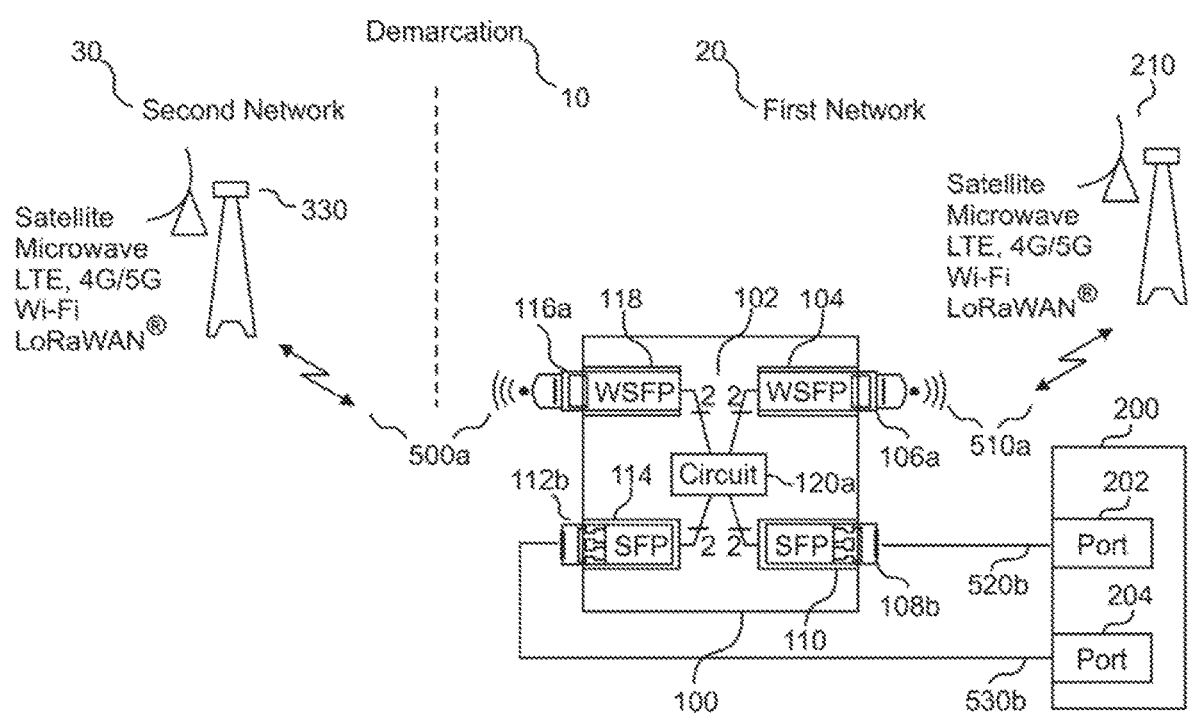
FIG. 18 is a diagram illustrating another embodiment of the Demarcation system and equipment of the present disclosure functioning as a wireless signal extender or repeater.

FIG. 18 illustrates a diagram of still another embodiment of the communications system and equipment of the present disclosure of a Demarcation established by the First Network 20. The Demarcation Device 100 of this embodiment establishes a Demarcation point or line 10 between a First Network 20 and a Second Network 30, specifically through a wireless SFP (WSFP) Device 116a. The Device 100 allows communication service to be transported between First and Second Networks and for the communication service to be monitored and/or injected by any physical media type. The Device 100 also allows the wireless signal to be extended using two WSFP devices with the same wireless signal interface or WSFP device type. An example is a WSFP Device 106a and a WSFP Device 116a supporting IEEE 802.11 (Wi-Fi) standard or a WSFP Device 106a supporting IEEE 802.11 (Wi-Fi), IEEE 802.15 (Bluetooth), 5G and a WSFP Device 116a supporting only IEEE 802.11 (Wi-Fi). Although both WSFP devices conform to the same wireless signal interface the WSFP devices may be provisioned to have different wireless signal formats or options. As an example, the IEEE 802.11 standard defines operation for wireless networks in both the 2.4 GHz and 5 GHz frequency ranges. The 2.4 GHz band is defined into 11 channels (1-11) and the 5 GHz band can have 36 to 165 channels. Adjacent Channel Interference (ACI) and Co-Channel Interference (CCI) will result in Wi-Fi signal disruption and performance degradation when 2.4 GHz or 5 GHz channels overlap and conflict A static channel plan or a vendor's dynamic channel assessment/assignment algorithm, a WSFP device with a IEEE802.11 (Wi-Fi) signal interface with a static or vendor's channel plan may require one or both WSFP devices to be provisioned for different channels or other end-user requirements.

The WSFP devices will perform a wireless-to-electrical-to-wireless signal conversion. The Device 100 as a wireless signal extender can address applications where the wireless signal does not have the signal strength to overcome physical distance and/or withstand impairments during the wireless transmission to the Second Network 30. A service provider network will typically use a wireless signal for wide area network or long reach applications, such as direct wireless, satellite, microwave, or cellular services LIE, IMT-2000 (4G) and IMT-2020 (5G). The WSFP device provides for a specific or combination of wireless signals and formats, such as IEEE 802.11a, b, g, n, ac, ax (Wi-Fi) signal, IEEE 802.15, Bluetooth wireless signals, IMT-2000 (4G), IMT-2020 (5G), and LoRa® and LoRaWAN® (trademarks of Semtech), or in combinations with other IoT wireless signals (Bluetooth, Zigbee, Lora, etc.). An example of a wireless SFP (WSFP) Device is illustrated in FIG. 21 and described in U.S. Pat. No. 10,446,909 B2, incorporated herein by reference. The Device 100 will provide a wireless signal extension between networks at the Demarcation point or line 10. The Device 100 will also provide communication service monitoring and/or testing with any physical media interfaces.

The First Network 20 includes a Wireless Tower or Satellite Dish 210 and a Communication Equipment 200 having Ports 202 and 204. The wireless Ports 202 and 204 of the Communication Equipment 200 provide communication service monitor and/or test functions. Die First Network 20 also includes the Device 100 having multiple Ports 104, 110, 114 and 118 as illustrated. The Device 100 has a wireless SFP (WSFP) Device 106a connected to SFP Port 104, a SFP Device 108b connected to SFP Port 110, a SFP Device 112b connected to SFP Port 114, and wireless SFP (WSFP) Device 116a connected to SFP Port 118. The Device 100 also has Circuitry 120a which defines the signal paths between the Ports of the Device. The Circuitry 120a is comprised of input and output differential amplifiers connected to multiplexer switches through differential paths 102, as discussed in more detail below with respect to FIG. 24. The Second Network 30 includes a Wireless Tower or Satellite Dish 330 used for a wireless signal for wide area network or long reach applications, such as direct wireless, satellite, microwave, or cellular services LTE, IMT-2000 (4G) and IMT-2020 (5G). The WSFP Devices can be alternatively replaced by various other SFP Devices to provide repeater functionality with other types of signals such as Ethernet 10GBase-T RJ45 to RJ45. These other SFP Devices provide different media interfaces and connection types, e.g., wire cable, optical cable, coax cable as represented in FIGS. 21A-E and 23A-C. The First Network 20 establishes a Demarcation point or line 10 with Device 100 through a WSFP Device 116a. A wireless signal 500a is used to interface the communication services between the First Network 20 and the Second Network 30 through Device 100, specifically connecting the wireless signal 500a from WSFP Device 116a to the Wireless Tower or Satellite Dish 330 of the Second Network 30. The Device 100 in turn connects to the Communication Equipment 200 of the First Network 20 through a second wireless signal 510a, specifically connecting the WSFP Device 106a to the Wireless Tower 210 of the First Network 10. A cable 520b is used to monitor and/or test the communication services of the Second Network 30, specifically connecting SFP Device 108b to Port 202 of the Communication Equipment 200. A cable 530b is used to monitor and/or test the communication services of the First Network 20, specifically connecting SFP Device 112b to Port 204 of the Communication Equipment 200.

Figure 19:
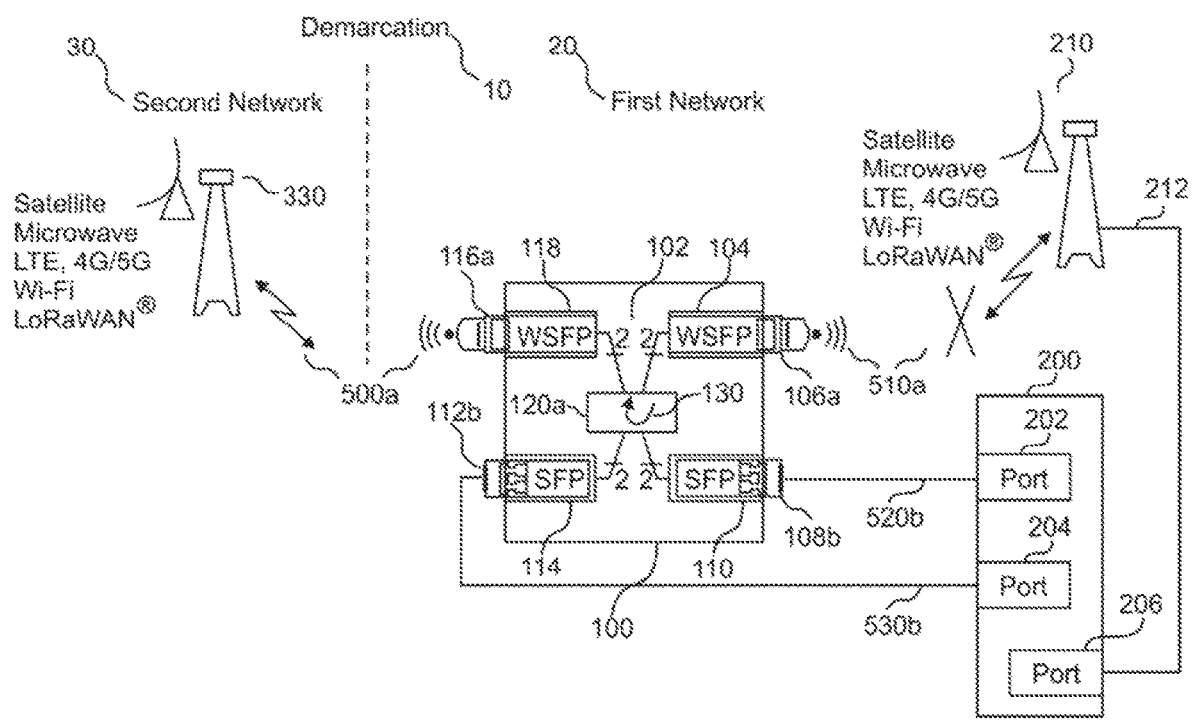
FIG. 19 is a diagram illustrating another embodiment of the Demarcation system and equipment of the present disclosure functioning as a wireless signal extender in a redundancy configuration.

FIG. 19 illustrates a diagram of still another embodiment of the communications system and equipment of the present disclosure of a Demarcation established by the First Network 20. The Demarcation Device 100 of this embodiment establishes a Demarcation point or line 10 between a First Network 20 and a Second Network 30, specifically through a wireless SFP (WSFP) Device 116a. The Device 100 allows a redundant communication service to be transported between First and Second Networks and for a disabled communication service to be monitored and/or injected by any physical media type. The Device 100 allows communication service to be transported between First and Second Networks and for the communication service to be monitored and/or injected by any physical media type. The Device 100 also allows the wireless signal to be extended using two WSFP devices with the same wireless signal interface or WSFP device type. An example is a WSFP Device 106a and a WSFP Device 116a supporting IEEE 802.11 (Wi-Fi) standard or a WSFP Device 106a supporting IEEE 802.11 (Wi-Fi), IEEE 802.15 (Bluetooth), 5G and a WSFP Device 116a supporting only IEEE 802.11 (Wi-Fi). Although both WSFP devices conform to the same wireless signal interface the WSFP devices may be provisioned to have different wireless signal formats or options. As an example, the IEEE 802.11 standard defines operation for wireless networks in both the 2.4 GHz and 5 GHz frequency ranges. The 2.4 GHz band is defined into 11 channels (1-11) and the 5 GHz band can have 36 to 165 channels. Adjacent Channel Interference (ACI) and Co-Channel Interference (CCI) will result in Wi-Fi signal disruption and performance degradation when 2.4 GHz or 5 GHz channels overlap and conflict. A WSFP device with a IEEE802.11 (Wi-Fi) signal interface with a static or vendor's channel plan may require one or both WSFP devices to be provisioned for different channels, formats, or algorithms.

The WSFP devices will perform a wireless-to-electrical-to-wireless signal extension. The Device 100 as a wireless signal extender can address applications where the wireless signal does not have the signal strength to overcome physical distance and/or withstand impairments during the wireless transmission to the Second Network 30. A service provider network will typically use a wireless signal for wide area network or long reach applications, such as direct wireless, satellite, microwave, or cellular services LIE, IMT-2000 (4G) and IMT-2020 (5G). The WSFP device provides for a specific or combination of wireless signals and formats, such as IEEE 802.11a, b, g, n, ac, ax (Wi-Fi) signal, IEEE 802.15, Bluetooth wireless signals, IMT-2000 (4G), IMT-2020 (5G), and LoRa® and LoRaWAN® (trademarks of Semtech), or in combinations with other IoT wireless signals (Bluetooth, Zigbee. Lora, etc.). An example of a wireless SFP (WSFP) Device is illustrated in FIG. 21 and described in U.S. Pat. No. 10,446,909 B2, incorporated herein by reference. The Device 100 will provide a wireless signal extension between networks at the Demarcation point or line 10. The Device 100 will also provide communication service monitoring and/or testing with any physical media interfaces.

The First Network 20 establishes a Demarcation point or line 10 with Device 100 through a WSFP Device 116a. A wireless signal 500a is used to interface the communication services between the First Network 20 and the Second Network 30 through Device 100, specifically connecting the wireless signal 500a from WSFP Device 116a to the Wireless Tower or Satellite Dish 330 of the Second Network 30. The Device 100 in turn connects to the Communication Equipment 200 of the First Network 20 through a second wireless signal 510a, specifically connecting the WSFP Device 106a to the Wireless Tower 210 of the First Network 10. A cable 520b is used to monitor and/or test the communication services of the Second Network 30, specifically connecting SFP Device 108b to Port 202 of the Communication Equipment 200. A cable 530b is used to monitor and/or test the communication services of the First Network 20, specifically connecting SFP Device 112b to Port 204 of the Communication Equipment 200.

The First Network 20 includes a Wireless Tower or Satellite Dish 210 and a Communication Equipment 200 having Ports 202, 204, and 206. Port 202 of the Communication Equipment 200 provides the redundant communication service of the wireless signal 510a to Device 100. Port 204 of the Communication Equipment 200 provides communication service monitoring and testing of the wireless communication service 510a of the First Network 20. Port 206 of the Communication Equipment 200 provides the redundant communication service of the Wireless Tower 210. If the wireless signal 510a becomes impaired or disrupted, as represented by the "X" in FIG. 19, the Device 100 Port 110 will route the redundant communication service of Cable 520b by means of the Device 100 Circuitry 120 to the wireless signal 116a.

The First Network 20 also includes the Device 100 having multiple Ports 104, 110, 114 and 118 as illustrated. The Device 100 has a wireless SFP (WSFP) Device 106a connected to SFP Port 104, a SFP Device 108b connected to SFP Port 110, a SFP Device 112b connected to SFP Port 114, and wireless SFP (WSFP) Device 116a connected to SFP Port 118. The Device 100 also has Circuitry 120a which defines the signal paths between the Ports of the Device. The Circuitry 120a is comprised of input and output differential amplifiers connected to multiplexer switches through differential paths 102, as discussed in more detail below with respect to FIG. 24. The Second Network 30 includes communication equipment represented as a Wireless lower or Satellite Dish 330 used for a wireless signal for wide area network or long reach applications, such as direct wireless, satellite, microwave, or cellular services LIE, IMT-2000 (4G) and IMT-2020 (5G). The WSFP Devices can be alternatively replaced by various other SFP Devices to provide repeater functionality with other types of signals such as Ethernet 100Base-T RJ45 to RMS. These other SFP Devices provide different media interfaces and connection types, e.g., wire cable, optical cable, coax cable as represented in FIGS. 21A-E and 23A-C.

A cable 520b is used as the redundant or mirrored communication service of wireless signal 510a. A cable 530b is used to monitored communication services of the First Network 20. The Device 100 will manually or automatically configure to a redundancy operation upon quality degradation or disruption to the wireless signal 510a or failure of the WSFP Device 106a. The Device 100 configured in a redundancy operation will connect the First Network 20 and a Second Network 30 through Device 100, specifically connecting the wireless signal 500a from WSFP Device 116a to the Wireless Tower or Satellite Dish 330 of the Second Network 30. The Device 100 in turn connects to the Communication Equipment 200 Port 202 of the First Network 20 through a cable 520b, specifically connecting the SFP device 108b.

The Communication Equipment 200 Port 204 cable 530b monitors the wireless signal 510a received from SFP Device 112b to evaluate and determine if the receive communication path from the Wireless Tower 210 to the WSFP Device 106a is functional or operational. The Communication Equipment 200 Port 204 can then inject signals into cable 530b for testing the wireless signal 510a transmit path from the WSFP Device 106a to the Wireless Tower 210. The Device 100 can initiate a signal loopback via the communication path 130 of Circuit 120a to further test and isolate the wireless signal 510a and the WSFP Device 106a. When the First Network 20 re-establishes the operation of the wireless signal 510a, the Device 100 can re-configure back to normal operation, specifically connecting the wireless signal 500a from WSFP Device 116a to the Wireless Tower or Satellite Dish 330 of the Second Network 30. The Device 100 in turn connects to the Wireless Tower 210 of the First Network 20 through a wireless signal 510a, specifically connecting the WSFP 106a to the SFP Port 104.

Figure 20A:
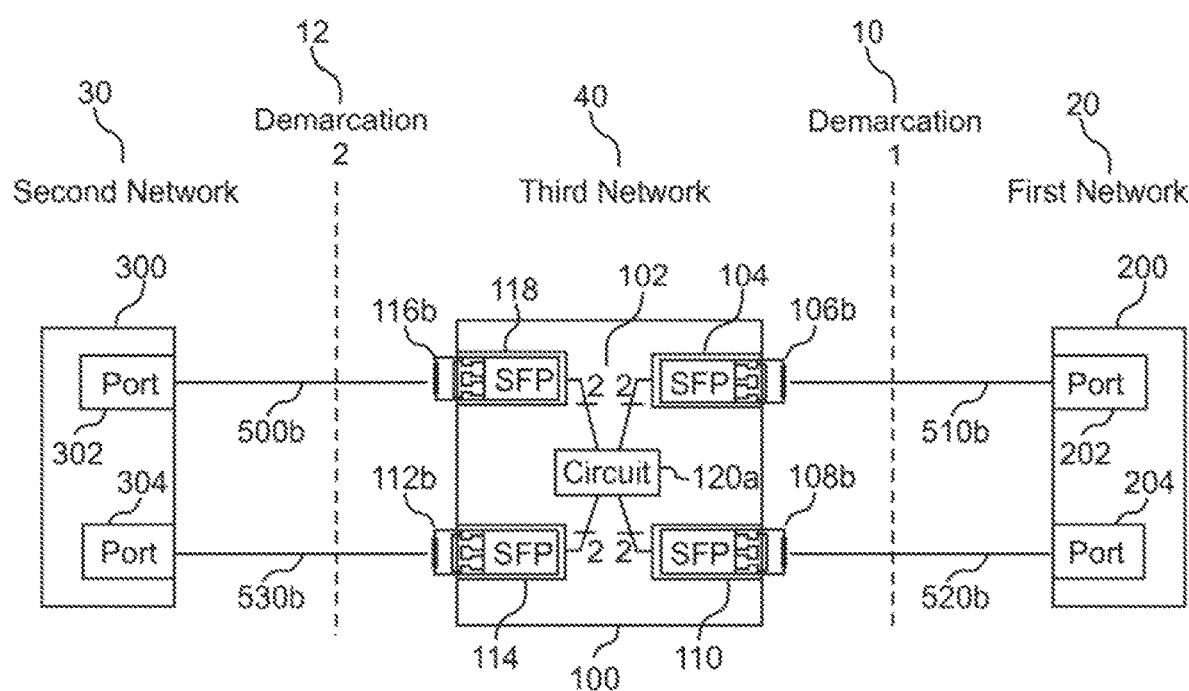
FIGS. 20A-B are diagrams illustrating another embodiment of the Demarcation system and equipment of the present disclosure establishing a third network Demarcation point between two other networks using one Demarcation Device.

FIG. 20A illustrates a diagram of an embodiment of the communications system and equipment of the present disclosure of two Demarcation points or fines established by a Third Network 40 for a First Network 20 and a Second Network 30. The Demarcation Device 100 establishes a First Demarcation point or line 10 (Demarcation 1) between the First Network 20 and the Third Network 40, specifically through a SFP Device 106b. The Device 100 establishes a Second Demarcation point or line 12 (Demarcation 2) between the Second Network 30 and the Third Network 40, specifically through SFP Device 116b. The Device 100 allows communication service to be transported between the First Network 20 and the Second Network 30 through the Third Network 40. The Third Network 40 can monitor and/or test the communication service from the First Network 20 and the Second Network 30 using Communication or Test Equipment 400 of the Third Network 40. The Third Network 40 can provide redundancy to the First Network 20 and the Second Network 30.

The First Network 20 includes Communication Equipment 200 having Ports 202 and 204. The Port 202 through cable 510b provides communication service that represents a mirrored or redundant communication service of the cable 520b. The Port 204 of the Communication Equipment 200 provides communication service monitoring and testing of the communication service of cable 510b of the First Network 20. The Third Network 40 includes the Device 100 having multiple Ports 104, 110, 114 and 118 as illustrated. The Device 100 has a SFP Device 106b connected to SFP Port 104, a SFP Device 108b connected to SFP Port 110, a SFP Device 112b connected to SFP Port 114, and SFP Device 116b connected to SFP Port 118. The Device 100 also has Circuitry 120a which defines the signal paths between the Ports of the Device. The Circuitry 120a is comprised of input and output differential amplifiers connected to multiplexer switches through differential paths 102, as discussed in more detail below with respect to FIG. 24. The Second Network 30 includes Communication Equipment 300 having a Ports 302 and 304. A cable 520b is used to monitor and/or test the communication services of the Second Network 30, specifically connecting SFP Device 108b to Port 204 of the Communication Equipment 200. A cable 530b is used to monitor and/or test the communication services of the First Network 20, specifically connecting SFP Device 112b to Port 304 of the Communication Equipment 300.

Figure 20B:
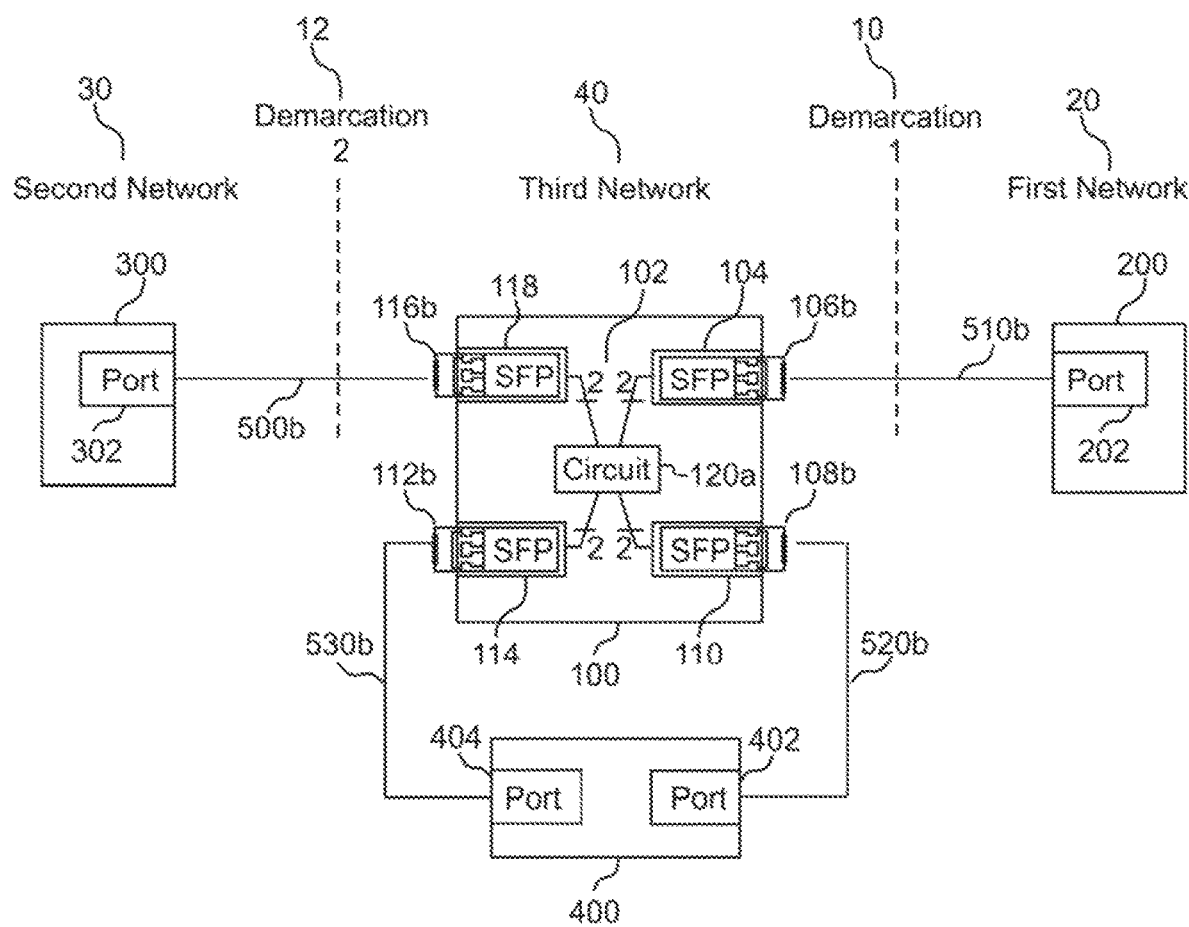

FIG. 20B illustrates a diagram of an embodiment of the communications system and equipment of the present disclosure of two Demarcation points or lines established by a Third Network 40 for the First Network 20 and Second Network 30. The Demarcation Device 100 establishes a First Demarcation point or line 10 (Demarcation 1) between the First Network 10 and the Third Network 40, specifically through a SFP Device 106*b*. The Device 100 establishes a Second Demarcation point or line 12 (Demarcation 2) between the Second Network 30 and the Third Network 40, specifically through SFP Device 116*b*. The Device 100 allows communication service to be transported between the First Network 20 and the Second Network 30 through the Third Network 40. The Third Network 40 provides monitoring and testing for the First Network 20 and the Second Network 30.

The First Network 20 includes Communication Equipment 200 having a Port 202. The Second Network 30 includes Communication Equipment 300 having a Port 302

The Third Network 20 includes the Device 100 having multiple Ports 104, 110, 114 and 118 as illustrated. The Device 100 has a SFP Device 106*b* connected to SFP Port 104, a SFP Device 108*b* connected to SFP Port 110, a SFP Device 112*b* connected to SFP Port 114, and SFP Device 116*b* connected to SFP Port 118. The Device 100 also has Circuitry 120*a* which defines the signal paths between the Ports of the Device. The Circuitry 120*a* is comprised of input and output differential amplifiers connected to multiplexer switches through differential paths 102, as discussed in more detail below with respect to FIG. 24. The Third Network 40 also includes Communication Equipment 400 having a Ports 402 and. 404. A cable 520*b* is used to monitor and/or test the Second Network 30 communication services, specifically connecting SFP Device 108*b* to the Port 402 of the Communication Equipment 400. A cable 530*b* is used to monitor and/or test the First Network 20, specifically connecting SFP Device 112*b* to the Port 404 of the Communication Equipment 400.

FIGS. 21A-E illustrates a wireless SFP (WSFP) Device small form factor pluggable Device with a wireless interface. In FIGS. 21A-C, a WSFP Device with an integrated PCB antenna 700 is illustrated in various orientation views. In FIG. 21D, a coax WSFP Device 702 and associated external coax cable and antenna 704 is illustrated. In FIG. 21E, a HMDI WSFP Device 706 is also illustrated as another type of wireless SFP Device. A WSFP Device can provide various wireless interface such as IEEE 802.11a, b, g, n, ac, ax (Wi-Fi) signal, IEEE 802.15, Bluetooth wireless signals, IMT-2000 (4G), IMT-2020 (5G), and LoRa® and LoRaWAN® (trademarks of Semtech).

Figure 22A:
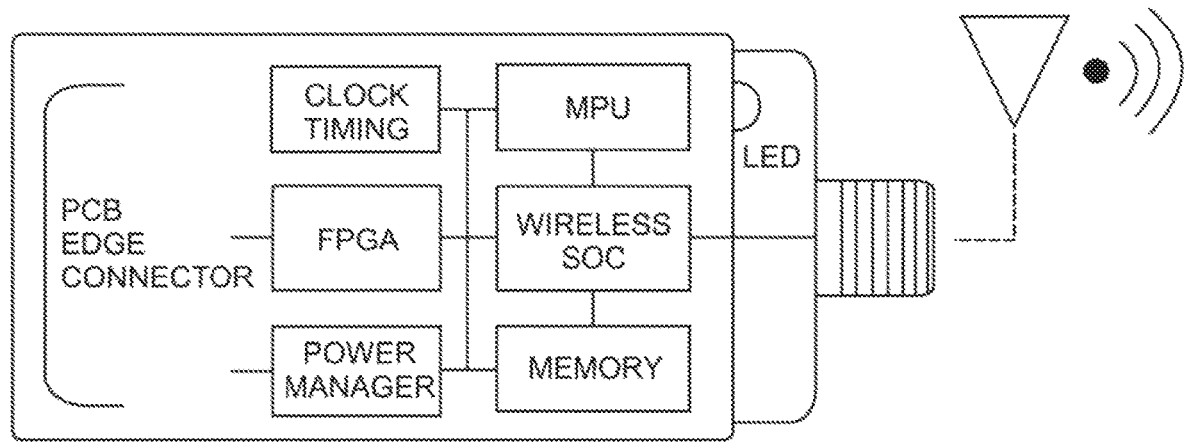
FIGS. 22A-B are block diagrams of wireless WSFP Devices.
Figure 22B:
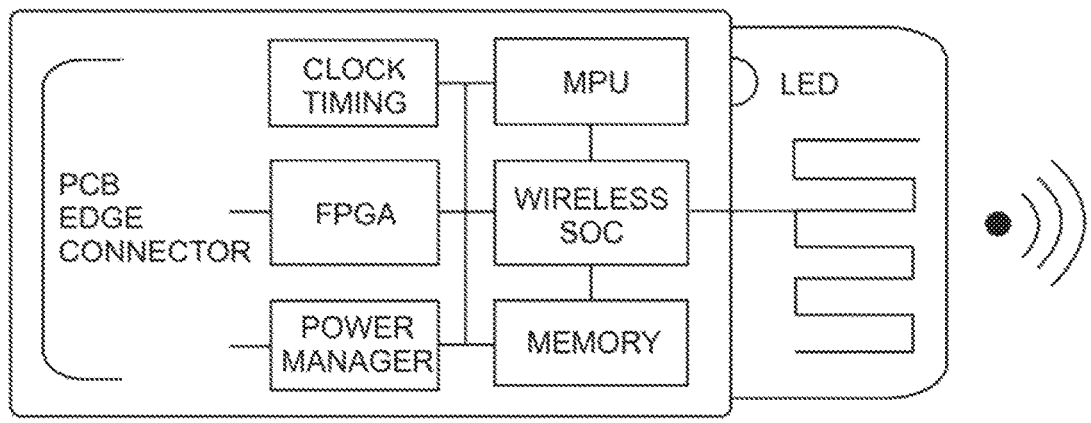

FIGS. 22A-B illustrates a diagram of a wireless SFP (WSFP) Device in reference to U.S. Pat. No. 10,446,909, incorporated herein by reference. In FIG. 22A the WSFP device is a coax WSFP Device 702. In FIG. 22B, the WSFP device is a WSFP Device with an integrated PCB antenna 700. The WSFP will include a system-on-a chip (SOC) Qualcomm® Snapdragon™ X55, X60 5G Modem-RF System or similar Device to provide different wireless signal interlaces and associated wireless signal conversion to electrical signals. The FPGA and the Clock Time blocks will provide electrical signal rate and format adaptions for differential signal conversions per the SFP MSA specifications.

FIGS. 23A-C illustrates SFP Devices with other signal interfaces. FIG. 23A illustrates a SFP Device 708 with a RJ45 cable interface. FIG. 23B illustrates a SFP Device 710 with a single LC optical interface. FIG. 23C illustrates a SFP Device 712 with a dual LC optical interface.

Figure 24:
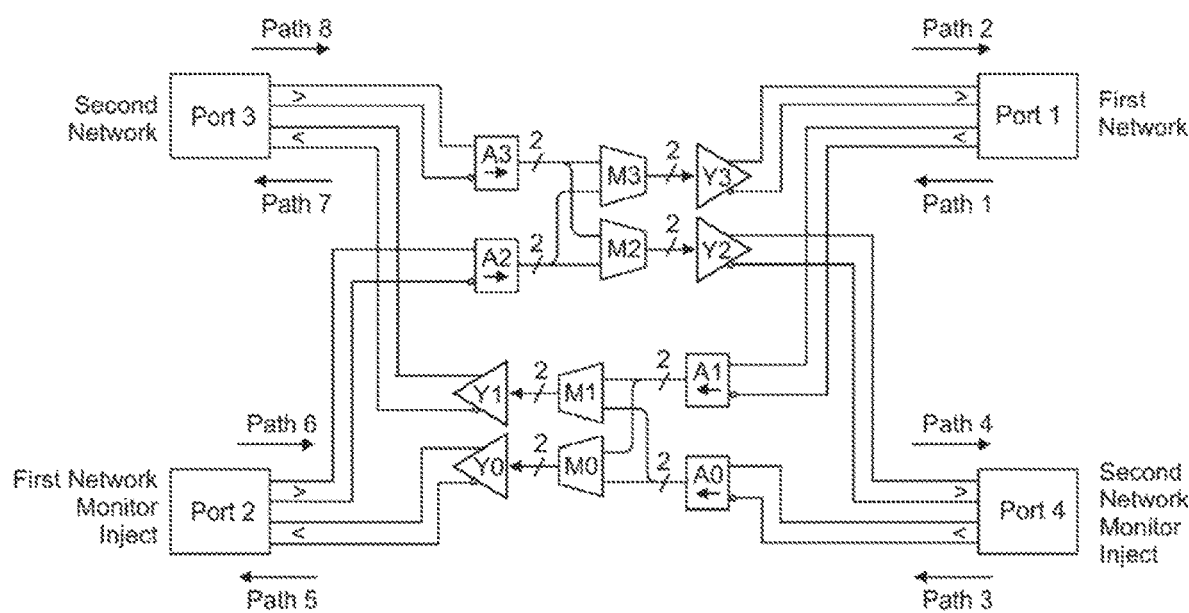
FIG. 24 is a schematic diagram illustrating an embodiment of the communications system and equipment of the present disclosure.
Figure 25:
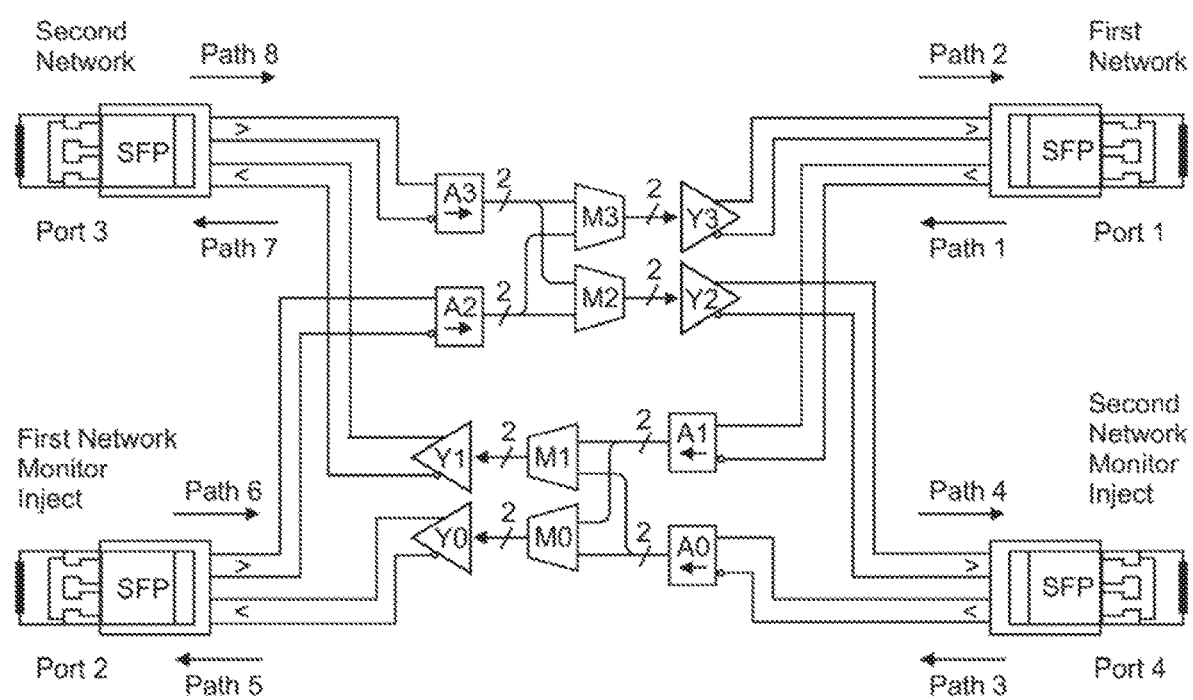
FIG. 25 is a schematic diagram illustrating another embodiment of the communications system, equipment, and SFP Devices of the present disclosure.

FIG. 24 illustrates a diagram of one embodiment of the Circuitry of the present disclosure, representing for example a communication Device with a plurality of Port connectors, which are each connected to an input and output differential amplifier, wherein the differential amplifiers connect to a multiplexer switch. As shown in FIG. 24, the communication Device first Port connector Port 1 is configured to interface signals from a First Network. Hie communication Device second Port connector Port 2 is configured to monitor a signal from the First Network. The second Port connector Port 2 is also configured to monitor a signal from the First Network and inject a signal to the First Network. The communication Device third Port connector Port 3 is configured to interface signals from a Second Network. The communication Device fourth Port connector Port 4 is configured to monitor a signal from a Second Network. The fourth Port connector Port 4 is also configured to monitor a signal from a Second Network and inject a signal to the Second Network. Further, in use, a SFP or WSFP Device as described above is inserted into each Port, as illustrated in FIG. 25. The SFP Device connects to one or more cables, whereas the WSFP Device connects via a wireless signal. The SFP Device can be alternatively replaced by various other SFP and WSFP Devices. These other SFP Devices provide different media interfaces and connection types, e.g., wire cable, optical cable, coax cable, and wireless, for example as illustrated in FIGS. 21A-E and 23A-C.

More specifically, FIG. 24 illustrates a diagram of Circuitry of the present disclosure involving four Ports; Port 1, Port 2, Port 3, and Port 4 and eight differential signal paths. Port 1 has two differential signal paths, Path 1 and Path 2. Port 2 has two differential signal paths Path 3 and Path 4. Port 3 has two differential signal paths Path 5 and Path 6. Port 4 has two differential signal paths Path 7 and Path 8.

There are four input broadband differential amplifiers A0, A1, A2, and A3. The broadband differential amplifiers provide amplification and conditioning of the input signal. There are four multiplexer switches M0, M1, M2, and M3. The multiplexer switches function as a crosspoint switch, demultiplexer, or multiplexer for routing the signals. There are four high speed output differential amplifiers Y0, Y1, Y2, and Y3. The high speed output differential amplifiers provide fixed or variable output voltages with and without pre-emphasis. The high speed output differential amplifiers Y0, Y1, Y2, and Y3 each include a retimer.

Port 1 comprises a Path 1 representing an input differential signal and a Path 2 representing an output differential signal. Port 2 comprises a Path 6 representing an input differential signal and a Path 5 representing an output differential signal. Port 3 comprises a Path 8 representing an input differential signal and a Path 7 representing an output differential signal. Port 4 comprises a Path 3 representing an input differential signal and a Path 4 representing an output differential signal.

Path 1 input differential signals connect to the input differential amplifier A1. The output signal from differential amplifier A1 can be a differential or common-mode signal. This output signal from differential amplifier A1 connects to the input of Multiplexer Switches M1 and M0.

Path P2 output differential signals connect to the output differential amplifier Y3. The input signal to differential amplifier Y3 can be a differential or common-mode signal. This input signal to differential amplifier Y3 connects to the output of Multiplexer Switch M3.

Path P3 input differential signals connect to the input differential amplifier A0. The output signal from differential amplifier A0 can be a differential or common-mode signal. This output signal from differential amplifier A0 connects to the input of Multiplexer Switches M0 and M1.

Path P4 output differential signals connect to the output differential amplifier Y2. The input signal to differential amplifier Y2 can be a differential or common-mode signal. This input signal to differential amplifier Y2 connects to the output of Multiplexer Switch M2.

Path P5 output differential signals connect to the output differential amplifier Y0. The input signal to differential amplifier Y0 can be a differential or common-mode signal. The input signal to differential amplifier Y0 connects to the output of Multiplexer Switch M0.

Path P6 input differential signals connect to the input differential amplifier A2. The output signal from differential amplifier A2 can be a differential or common-mode signal. This output signal from differential amplifier A2 connects to the input of Multiplexer Switches M2 and M3.

Path P7 output differential signals connect to the output differential amplifier Y1. The input signal to differential amplifier Y1 can be a differential or common-mode signal. The input signal to differential amplifier Y1 connects to the output of Multiplexer Switch M1.

Path P8 input differential signals connect to the input differential amplifier A3. The output signal from differential amplifier A3 can be a differential or common-mode signal. This output signal from differential amplifier A3 connects to the input of Multiplexer Switches M3 and M2.

FIGS. 26A-F illustrate other embodiments of the Circuitry of the present disclosure having three ports (Ports 1, 2 and 3) and six paths. The circuitry includes up to four differential input amplifiers A0, A1, A2 and A3, multiplexers M0, M1, M2 and M3, and differential output Y0, Y1, Y2 and Y3, depending on the specific embodiment discussed below. These embodiments provides monitoring, cut-thru, and redundancy using three ports. On-demand functionality is not supported in this embodiment due to the implementation of only three ports.

Figure 26A:
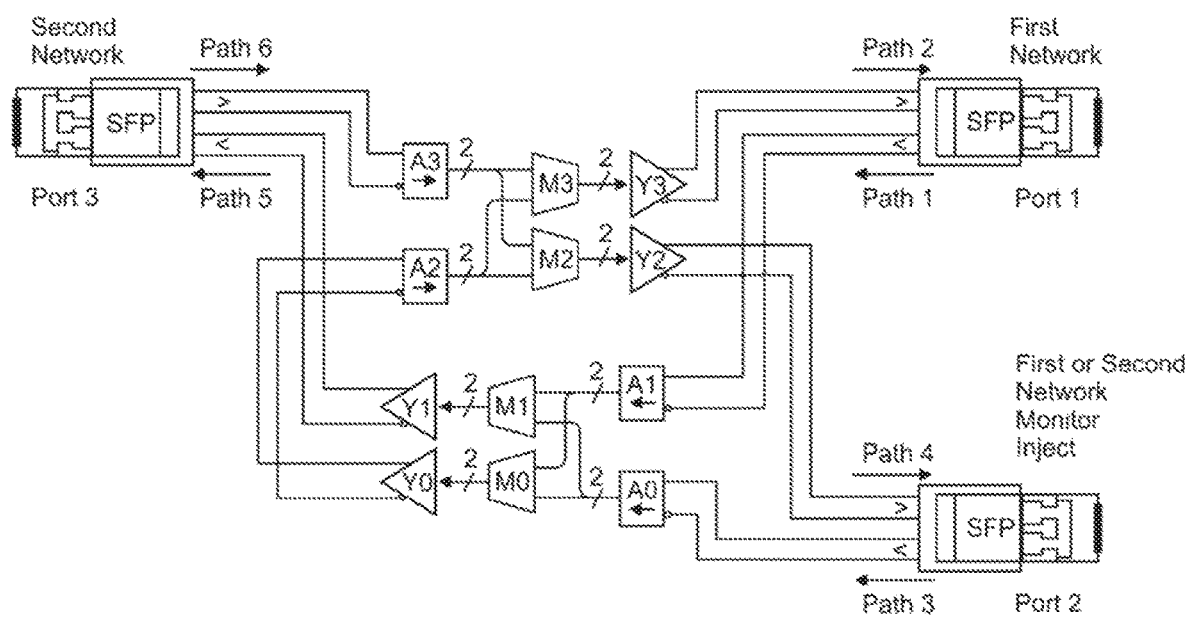
FIG. 26A is a schematic diagram illustrating a three port embodiment of the communications system, equipment, and the SFP Devices of the present disclosure.

More specifically. FIG. 26A illustrates a diagram of the Circuitry of the present disclosure involving three Ports; Port 1, Port 2, and Port 3 and six differential signal paths. Port 1 has two differential signal paths. Path 1 and Path 2. Port 2 has two differential signal paths Path 3 and Path 4. Port 3 has two differential signal paths Path 5 and Path 6.

There are four input broadband differential amplifiers A0, A1, A2, and A3. The broadband differential amplifiers provide amplification and conditioning of the input signal. There are four multiplexer switches M0, M1, M2, and M3. The multiplexer switches function as a crosspoint switch, demultiplexer, or multiplexer for routing the signals. There are four high speed output differential amplifiers Y0, Y1, Y2, and Y3. The high speed output differential amplifiers provide fixed or variable output voltages with and without pre-emphasis. The high speed output differential amplifiers Y0, Y1, Y2, and Y3 each include a retimer. A retimer is circuitry used to extract the signal's embedded clock and retransmit the signal with a renewed clock. The retransmitted signal will have a signal with a reduced amount of jitter and a frequency re-centered.

Port 1 comprises a Path 1 representing an input differential signal and a Path 2 representing an output differential signal. Port 2 comprises a Path 3 representing an input differential signal and a Path 4 representing an output differential signal. Port 3 comprises a Path 6 representing an input differential signal and a Path 5 representing an output differential signal.

Path P1 input differential signals connect to the input differential amplifier A1. The output signal from differential amplifier A1 can be a differential or common-mode signal. This output signal from differential amplifier A1 connects to the input of Multiplexer Switch M0 and M1.

Path P2 output differential signals connect to the output differential amplifier Y3. The input signal to differential amplifier Y3 can be a differential or common-mode signal. This input signal to differential amplifier Y3 connects to the output of Multiplexer Switch M3.

Path P3 input differential signals connect to the input differential amplifier A0. The output signal from differential amplifier A0 can be a differential or common-mode signal. This output signal from differential amplifier A0 connects to the input of Multiplexer Switch M0 and M1.

Path P4 output differential signals connect to the output differential amplifier Y2. The input signal to differential amplifier Y2 can be a differential or common-mode signal. This input signal to differential amplifier Y2 connects to the output of Multiplexer Switch M2.

Path P5 output differential signals connect to the output differential amplifier Y1. The input signal to differential amplifier Y1 can be a differential or common-mode signal. The input signal to differential amplifier Y1 connects to the output of Multiplexer Switch M1.

Path P6 input differential signals connect to the input differential amplifier A3. The output signal from differential amplifier A3 can be a differential or common-mode signal. This output signal from differential amplifier A3 connects to the input of Multiplexer Switch M2 and M3.

The input signal to differential amplifier Y0 can be a differential or common-mode signal. The input signal to differential amplifier Y0 connects to the output of Multiplexer Switch M0. The output signal to differential amplifier Y0 connects to the input differential amplifier A2. The output signal from differential amplifier A2 connects to the input of Multiplexer Switch M2 and M3.

Figure 26B:
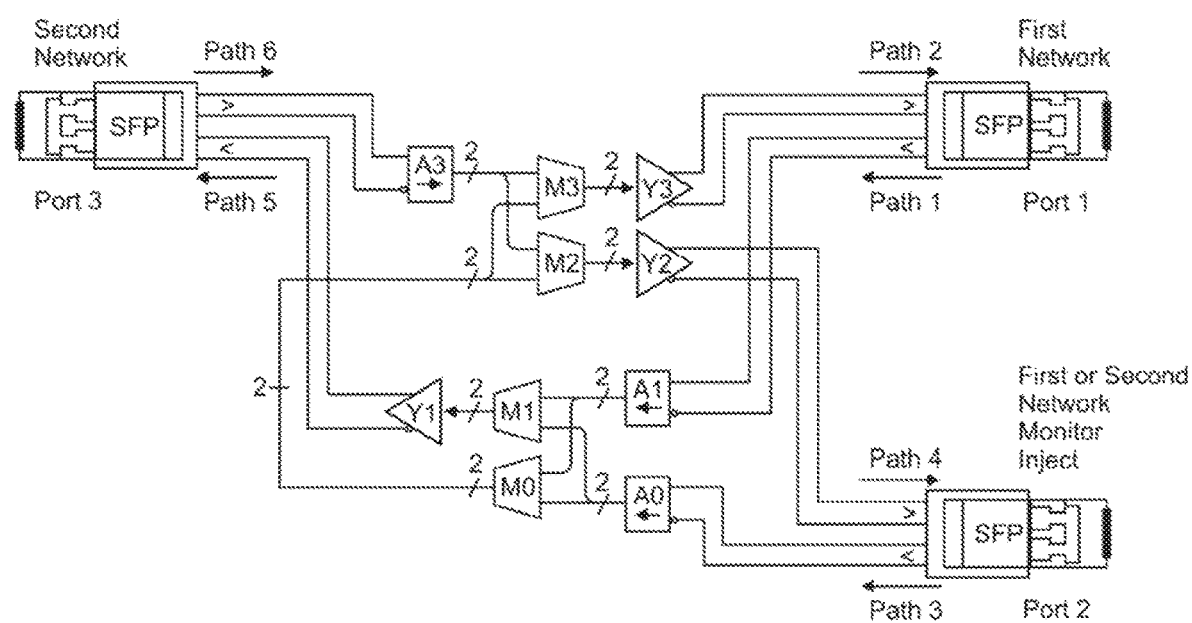
FIG. 26B is a schematic diagram illustrating an alternative three port embodiment of the communication system, equipment, and the SFP Devices of the present disclosure illustrated in FIG. 26A.

FIG. 26B illustrates another embodiment of a diagram of the Circuitry of the present disclosure involving three Ports; Port 1, Port 2, and Port 3 and six differential signal paths. Port 1 has two differential signal paths. Path 1 and Path 2. Port 2 has two differential signal paths Path 3 and Path 4. Port 3 has two differential signal paths Path 5 and Path 6. In this embodiment, the circuitry has been optimized for three ports by reducing one input broadband differential amplifier and one output differential amplifier.

There are three input broadband differential amplifiers A0, A1, and A3. The broadband differential amplifiers provide amplification and conditioning of the input signal. There are four multiplexer switches M0, M1, M2, and M3. The multiplexer switches function as a crosspoint switch, demultiplexer, or multiplexer for routing the signals. There are three high speed output differential amplifiers Y1, Y2, and Y3. The high speed output differential amplifiers provide fixed or variable output voltages with and without pre-emphasis. The high speed output differential amplifiers Y1, Y2, and Y3 each include a retimer. A retimer is circuitry used to extract the signal's embedded clock and retransmit the signal with a renewed clock. The retransmitted signal will have a signal with a reduced amount of jitter and a frequency re-centered.

Port 1 comprises a Path 1 representing an input differential signal and a Path 2 representing an output differential signal. Port 2 comprises a Path 3 representing an input differential signal and a Path 4 representing an output differential signal. Port 3 comprises a Path 6 representing an input differential signal and a Path 5 representing an output differential signal.

Path P1 input differential signals connect to the input differential amplifier A1. The output signal from differential amplifier A1 can be a differential or common-mode signal. This output signal from differential amplifier A1 connects to the input of Multiplexer Switch M0 and M1.

Path P2 output differential signals connect to the output differential amplifier Y3. The input signal to differential amplifier Y3 can be a differential or common-mode signal. This input signal to differential amplifier Y3 connects to the output of Multiplexer Switch M3.

Path P3 input differential signals connect to the input differential amplifier A0. The output signal from differential amplifier A0 can be a differential or common-mode signal. This output signal from differential amplifier A0 connects to the input of Multiplexer Switch M0 and M1.

Path P4 output differential signals connect to the output differential amplifier Y2. The input signal to differential amplifier Y2 can be a differential or common-mode signal. This input signal to differential amplifier Y2 connects to the output of Multiplexer Switch M2.

Path P5 output differential signals connect to the output differential amplifier Y1. The input signal to differential amplifier Y1 can be a differential or common-mode signal. The input signal to differential amplifier Y1 connects to the output of Multiplexer Switch M1.

Path P6 input differential signals connect to the input differential amplifier A3. The output signal from differential amplifier A3 can be a differential or common-mode signal. This output signal from differential amplifier A3 connects to the input of Multiplexer Switch M2 and M3.

The output signal of Multiplexer Switch M0 can be a differential or common-mode signal. This output signal connects to the input of Multiplexer Switch M2 and M3.

Figure 26C:
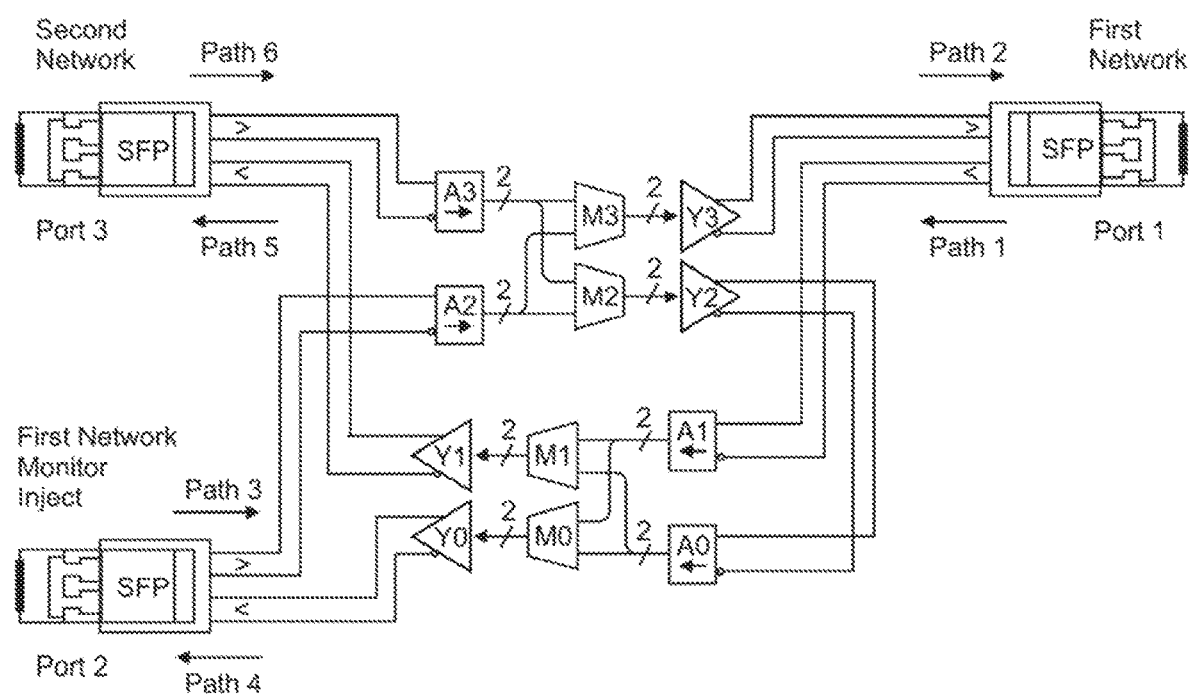
FIG. 26C is a schematic diagram illustrating another three port embodiment of the communications system, equipment, and the SFP Devices of the present disclosure.

FIG. 26C illustrates a diagram of the Circuitry of the present disclosure involving three Ports; Port 1, Port 2, and Port 3 and six differential signal paths. Port 1 has two differential signal paths, Path 1 and Path 2. Port 2 has two differential signal paths Path 3 and Path 4. Port 3 has two differential signal paths Path 5 and Path 6.

There are four input broadband differential amplifiers A0, A1, A2, and A3. The broadband differential amplifiers provide amplification and conditioning of the input signal. There are four multiplexer switches M0, M1, M2, and M3. The multiplexer switches function as a crosspoint switch, demultiplexer, or multiplexer for routing the signals. There are four high speed output differential amplifiers Y0, Y1, Y2, and Y3. The high speed output differential amplifiers provide fixed or variable output voltages with and without pre-emphasis. The high speed output differential amplifiers Y0, Y1, Y2, and Y3 each include a retimer. A retimer is circuitry used to extract the signal's embedded clock and retransmit the signal with a renewed clock. The retransmitted signal will have a signal with a reduced amount of jitter and a frequency re-centered.

Port 1 comprises a Path 1 representing an input differential signal and a Path 2 representing an output differential signal. Port 2 comprises a Path 3 representing an input differential signal and a Path 4 representing an output differential signal. Port 3 comprises a Path 6 representing an input differential signal and a Path 5 representing an output differential signal.

Path 1 input differential signals connect to the input differential amplifier A1. The output signal from differential amplifier A1 can be a differential or common-mode signal. This output signal from differential amplifier A1 connects to the input of Multiplexer Switch M0 and M1.

Path P2 output differential signals connect to the output differential amplifier Y3. The input signal to differential amplifier Y3 can be a differential or common-mode signal. This input signal to differential amplifier Y3 connects to the output of Multiplexer Switch M3.

Path P3 input differential signals connect to the input differential amplifier A2. The output signal from differential amplifier A2 can be a differential or common-mode signal. This output signal from differential amplifier A2 connects to the input of Multiplexer Switch M2 and M3.

Path P4 output differential signals connect to the output differential amplifier Y0. The input signal to differential amplifier Y0 can be a differential or common-mode signal. This input signal to differential amplifier Y0 connects to the output of Multiplexer Switch M0.

Path P5 output differential signals connect to the output differential amplifier Y1. The input signal to differential amplifier Y1 can be a differential or common-mode signal. The input signal to differential amplifier Y1 connects to the output of Multiplexer Switch M1.

Path P6 input differential signals connect to the input differential amplifier A3. The output signal from differential amplifier A3 can be a differential or common-mode signal. This output signal from differential amplifier A3 connects to the input of Multiplexer Switch M2 and M3.

The input signal to differential amplifier Y2 can be a differential or common-mode signal. The input signal to differential amplifier Y2 connects to the output of Multiplexer Switch M2. The output signal to differential amplifier Y2 connects to the input differential amplifier A0. The output signal from differential amplifier A0 connects to the input of Multiplexer Switch M0 and M1.

Figure 26D:
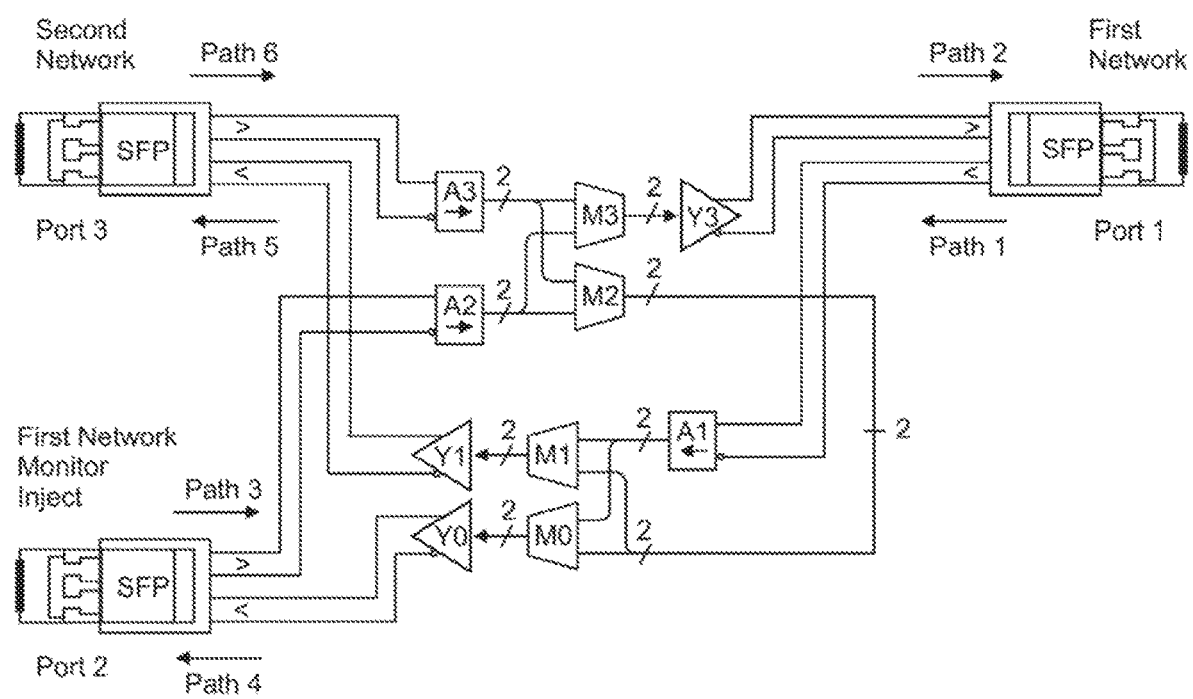
FIG. 26D is a schematic diagram illustrating an alternative three port embodiment of the communication system, equipment, and the SFP Devices of the present disclosure illustrated in FIG. 26C.

FIG. 26D illustrates another embodiment of a diagram of the Circuitry of the present disclosure involving three Ports; Port 1, Port 2, and Port 3 and six differential signal paths. Port 1 has two differential signal paths. Path 1 and Path 2. Port 2 has two differential signal paths Path 3 and Path 4. Port 3 has two differential signal paths Path 5 and Path 6. In this embodiment, the circuitry has been optimized for three ports by reducing one input broadband differential amplifier and one output differential amplifier.

There are three input broadband differential amplifiers A1, A2, and A3. The broadband differential amplifiers provide amplification and conditioning of the input signal. There are four multiplexer switches M0, M1, M2, and M3. The multiplexer switches function as a crosspoint switch, demultiplexer, or multiplexer for routing the signals. There are three high speed output differential amplifiers Y0, Y1, and Y3. The high speed output differential amplifiers provide fixed or variable output voltages with and without pre-emphasis. The high speed output differential amplifiers Y0, Y1, and Y3 each include a retimer. A retimer is circuitry used to extract the signal's embedded clock and retransmit the signal with a renewed clock. The retransmitted signal will have a signal with a reduced amount of jitter and a frequency re-centered.

Port 1 comprises a Path 1 representing an input differential signal and a Path 2 representing an output differential signal. Port 2 comprises a Path 3 representing an input differential signal and a Path 4 representing an output differential signal. Port 3 comprises a Path 6 representing an input differential signal and a Path 5 representing an output differential signal.

Path 1 input differential signals connect to the input differential amplifier A1. The output signal from differential amplifier A1 can be a differential or common-mode signal. This output signal from differential amplifier A1 connects to the input of Multiplexer Switch M0 and M1.

Path P2 output differential signals connect to the output differential amplifier Y3. The input signal to differential amplifier Y3 can be a differential or common-mode signal. This input signal to differential amplifier Y3 connects to the output of Multiplexer Switch M3.

Path P3 input differential signals connect to the input differential amplifier A2. The output signal from differential amplifier A2 can be a differential or common-mode signal. This output signal from differential amplifier A2 connects to the input of Multiplexer Switch M2 and M3.

Path P4 output differential signals connect to the output differential amplifier Y0. The input signal to differential amplifier Y0 can be a differential or common-mode signal. This input signal to differential amplifier Y0 connects to the output of Multiplexer Switch M0.

Path P5 output differential signals connect to the output differential amplifier Y1. The input signal to differential amplifier Y1 can be a differential or common-mode signal. The input signal to differential amplifier Y1 connects to the output of Multiplexer Switch M1.

Path P6 input differential signals connect to the input differential amplifier A3. The output signal from differential amplifier A3 can be a differential or common-mode signal. This output signal from differential amplifier A3 connects to the input of Multiplexer Switch M2 and M3.

The output signal of Multiplexer Switch M2 can be a differential or common-mode signal. This output signal connects to the input of Multiplexer Switch M0 and M1.

Figure 26E:
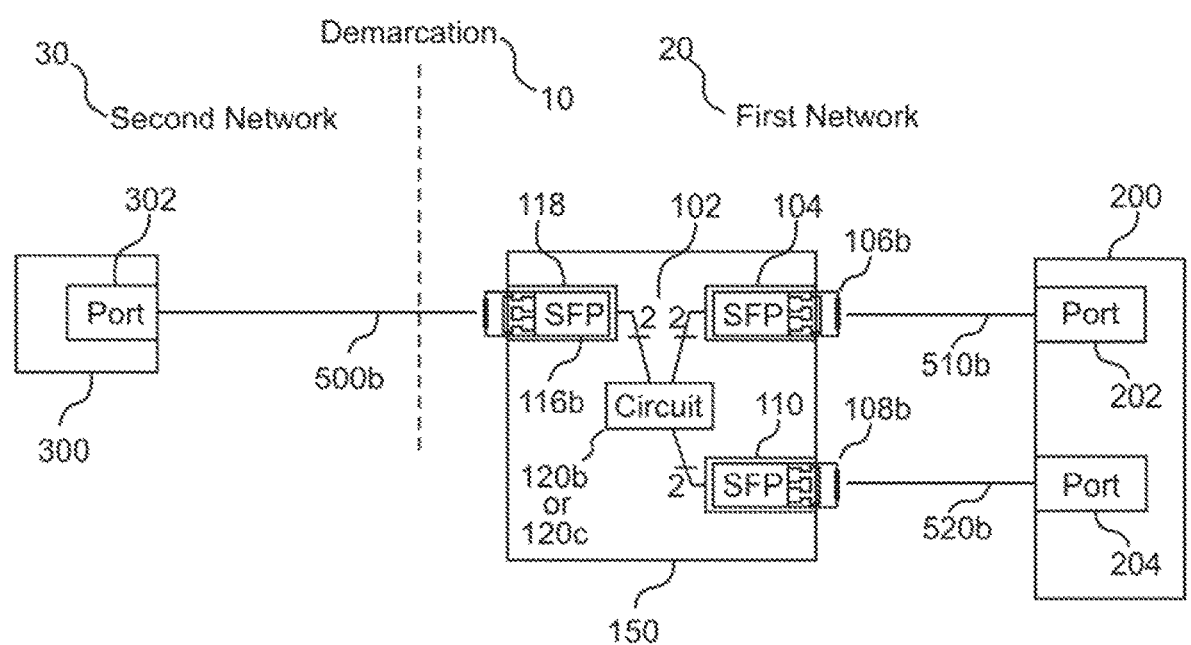
FIG. 26E is a diagram illustrating the three port embodiment of FIG. 26A or FIG. 26B of the Demarcation system and equipment of the present disclosure providing a Demarcation point for monitoring and/or testing the First or Second Network.

FIG. 26E illustrates a diagram of the three port embodiment of the communications system and equipment of the present disclosure of a Demarcation 10 established by the First Network 20. The Demarcation Device 150 of the present disclosure establishes a Demarcation point or line 10 between a First Network 20 and a Second Network 30, specifically through a SFP Device 116b in Port 118, in communication with a Port 302 on the Communication Equipment 300 of the Second Network 30. The Device 150 provides communication service to be transported between First and Second Networks and allows either the First or Second communication service to be monitored and/or injected. The Device 150 also provides a redundant path of the communication service of the First Network 20.

The First Network 20 includes Communication Equipment 200 having Ports 202 and 204. Port 204 of Communication Equipment 200 provides communication service monitoring or test functions for the First Network 20 or the Second Network 30. Port 204 of the Communication Equipment 200 also provides communication service redundancy of the First Network 20. The First Network 20 also includes the Device 150 having three Ports 104, 110 and 118 as illustrated. The Device 150 has a SFP Device 106b connected to SFP Port 104, a SFP Device 108b connected to SFP Port 110, and a SFP Device 116b connected to SFP Port 118. The Device 150 also has Circuitry 120b or 120c where Circuitry 120b or Circuitry 120c can alternately be implemented in this embodiment. Circuitry 120b is illustrated and described in FIG. 26A and Circuitry 120c illustrated and described in FIG. 26B. The Circuitry 120b and 120c are comprised of input and output differential amplifiers connected to multiplexer switches through differential paths 102. The Second Network 30 includes Communication Equipment 300 having a Port 302.

The First Network 20 establishes a Demarcation point or line 10 with Device 150 through SFP Port 118 through SFP Device 116b. The SFP Device 116b is used to interface the communication services between the First Network 20 and the Second Network 30, specifically interfacing the cable 500b from Port 302 of the Communication Equipment 300 of the Second Network 30. The Device 150 in turn connects to the Communication Equipment 200 of the First Network 20 through a cable 510b, specifically connecting the SFP 106b to Port 202 of the Communication Equipment 200 of First Network 10. A cable 520b is used to monitor and/or test the communication services of the First Network 20 or the Second Network 30, or provide redundancy for the communication services transported by signal 510b of the First Network 20, specifically connecting SFP Device 108b to Port 204 of the Communication Equipment 200. The SFP in this embodiment can be alternatively replaced by various other SFP Devices and WSFP Devices. These other SFP Devices and WSFP Devices provide different media interfaces and connection types, e.g., wire cable, optical cable, coax cable, and wireless as represented in FIGS. 21A-E and 23A-C.

Figure 26F:
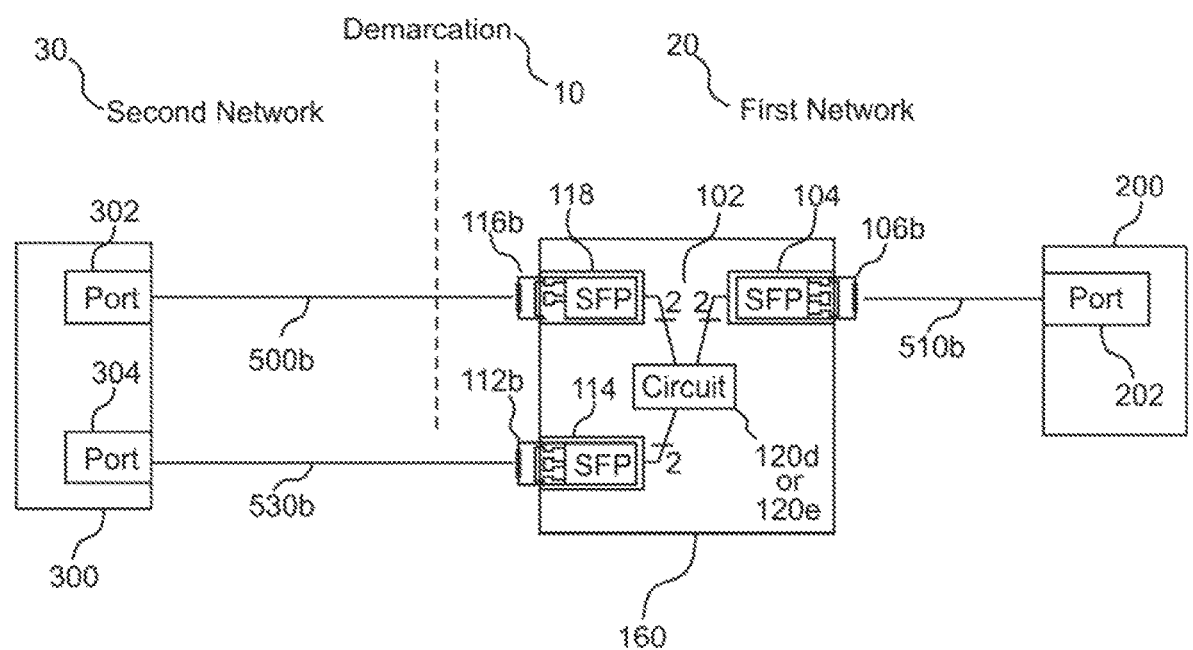
FIG. 26F is a diagram illustrating the three port embodiment of FIG. 26C or FIG. 26D of the Demarcation system and equipment of the present disclosure providing a Demarcation point for monitoring and/or testing the First or Second Network.

FIG. 26F illustrates a diagram of another three port embodiment of the communications system and equipment of the present disclosure of a Demarcation 10 established by the First Network 20. The Demarcation Device 160 of the present disclosure establishes a Demarcation point or line 10 between a First Network 20 and a Second Network 30, specifically through a SFP Device 116b in Port 118, in communication with a Port 302 on the Communication Equipment 300 of the Second Network 30. The Device 160 provides communication service to be transported between First and Second Networks and allows either the First or Second communication service to be monitored and/or injected.

The First Network 20 includes Communication Equipment 200 having Port 202. The Second Network 30 includes Communication Equipment 300 having Ports 302 and 304. The First Network 20 also includes the Device 160 having three Ports 104, 114 and 118 as illustrated. The Device 160 has a SFP Device 106b connected to SFP Port 104, a SFP Device 112b connected to SFP Port 114, and a SFP Device 116b connected to SFP Port 118. The Device 160 also has Circuitry 120d or 120e where Circuitry 120d or Circuitry 120e can alternately be implemented in this embodiment. Circuitry 120d is illustrated and described in FIG. 26C and Circuitry 120e illustrated and described in FIG. 26D. The Circuitry 120d and 120e are comprised of input and output differential amplifiers connected to multiplexer switches through differential paths 102. The Second Network 30 includes Communication Equipment 300 having Ports 302 and 304. Port 304 of Communication Equipment 300 provides communication service monitoring, and test functions to the First Network 20 or Second Network 30.

The First Network 20 establishes a Demarcation point or line 10 with Device 160 through SFP Port 118 through SFP Device 116b. The SFP Device 116b is used to interface the communication services between the First Network 20 and the Second Network 30, specifically interfacing the cable 500b from Port 302 of the Communication Equipment 300 of the Second Network 30. The Device 160 in turn connects to the Communication Equipment 200 of the First Network 20 through a cable 510b, specifically connecting the SFP 106b to Port 202 of the Communication Equipment 200 of First Network 20. A cable 530b is used to monitor and/or test the communication services of the First Network 20 or the Second Network 30, or provide redundancy for the communication services transported by signal 500b of the Second Network 30, specifically connecting SFP Device 112b to Port 304 of the Communication Equipment 300. The SFP in this embodiment can be alternatively replaced by various other SFP Devices and WSFP Devices. These other SFP Devices and WSFP Devices provide different media interfaces and connection types, e.g., wire cable, optical cable, coax cable, and wireless as represented in FIGS. 21A-E and 23A-C.

Figure 27:
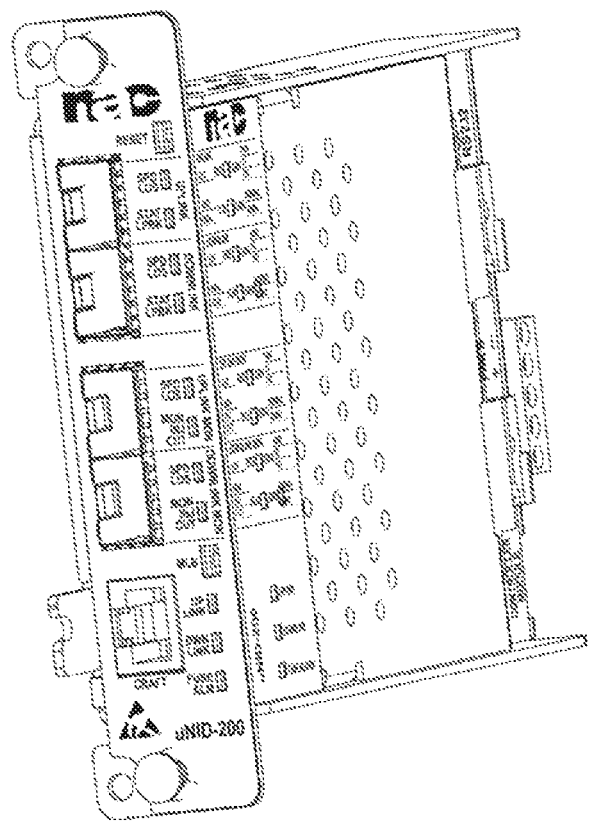
FIG. 27 is a graphical image of the mechanical form factor of a Device of the present disclosure.

FIG. 27 illustrates a front perspective view of an embodiment of an exemplary Demarcation Device of the present disclosure. As illustrated, on a front plate, four SFP Ports are aligned or positioned in a two by two, front to front orientation. Also on the front plate, an RJ45 jack provides an RS232 craft interface for Communication Equipment and service status, and equipment provisioning. As illustrated, a top cover is used to protect the electronic circuit assembly. The top cover provides LED indicators for equipment and service status when the Communication Equipment is horizontally installed on a wall.

While the embodiment(s) disclosed herein are illustrative of the structure, function and operation of the exemplary method(s), circuitry, equipment and device(s), it should be understood that various modifications may be made thereto with departing from the teachings herein. Further, the components of the method(s), circuitry, equipment and device(s) disclosed herein can take any suitable form, including any suitable hardware, software, circuitry or other components capable of adequately performing their respective intended functions, as may be known in the art. It should also be understood that all commercially available parts identified herein can be interchanged with other similar commercially available parts capable of providing the same function and results.

While the foregoing discussion presents the teachings in an exemplary fashion with respect to the disclosed method(s), circuitry, equipment, and device(s) for communication services and demarcation device(s), it will be apparent to those skilled in the art that the present disclosure may apply to other method(s), system(s), Device(s), equipment and circuitry for communication services. Further, while the foregoing has described what are considered to be the best mode and/or other examples, it is understood that various modifications may be made therein and that the subject matter disclosed herein may be implemented in various forms and examples, and that the method(s), system(s), device(s), equipment and circuitry may be applied in numerous applications, only some of which have been described herein,

What is claimed is:

1. A demarcation device for communications services, comprising:
    a plurality of Small Form-factor Pluggable (SFP) Ports; and
    circuitry defining a plurality of differential signaling paths between the ports,
    wherein the circuitry includes a plurality of input differential amplifiers, a plurality of multiplexer switchers, and a plurality of output differential amplifiers;
    wherein the plurality of differential signaling paths are adapted to provide at least one of remote service monitoring, remote signal injecting and redundancy;
    wherein the SFP Ports define at least one demarcation point or line; and
    wherein the circuitry is configured to interface media independent SFP devices providing interchangeable interfaces.

2. The device of claim 1, wherein a first Port defines a first path representing an input differential signal and a second path representing an output differential signal.

3. The device of claim 2, wherein a second Port defines a third path representing an input differential signal and a fourth path representing an output differential signal.

4. The device of claim 3, wherein a third Port defines a fifth path representing an output differential signal and a sixth path representing an input differential signal.

5. The device of claim 4, wherein a fourth Port defines a seventh path representing an output differential signal and an eight path representing an input differential signal.

6. The device of claim 1, wherein each differential amplifier includes a retimer.

7. The device of claim 6, further comprising a processor, timing Light Emitting Diode LED indicators, a status and provisioning interface, and power management.

8. The device of claim 1, wherein the device is adapted to establish at least two demarcation points or lines at the SFP Ports.

9. A system for establishing at least one demarcation point or line between a first communications network and at least one of a second communications network and a third communications network, the system comprising:
    a device having a plurality of Small Form-factor Pluggable (SFP) Ports, and circuitry having a plurality of input differential amplifiers, a plurality of multiplexer switchers, and a plurality of output differential amplifiers,
    wherein the circuitry defines a plurality of paths between the plurality of SFP Ports;
    a plurality of SFP devices connected to the plurality of SFP Ports, one per port; and
    a demarcation point or line defined by one of the plurality of SFP Ports;
    wherein the circuitry is configured to interface media independent SFP devices providing interchangeable interfaces.

10. The system of claim 9, wherein a first Port connector defines a first path representing an input differential signal and a second path representing an output differential signal.

11. The system of claim 10, wherein a second Pert connector defines a third path representing an input differential signal and a fourth path representing an output differential signal.

12. The system of claim 11, wherein a third Port connector defines a fifth path representing an output differential signal and a sixth path representing an input differential signal.

13. The system of claim 12, wherein a fourth Port connector defines a seventh path representing an output differential signal and an eighth path representing an input differential signal.

14. The system of claim 9, further comprising a second demarcation point or line defined by a second one of the plurality of SFP devices.

15. The system of claim 9, wherein the circuitry is adapted to remotely provide at least one or service monitoring, service protection switching, redundancy, on-demand service, security, testing, troubleshooting and service upgrades.

16. A method of establishing a demarcation point or line between a first communications network and a second communications network, comprising the steps of:
    providing a device having a plurality of Small Form-factor Pluggable SFP Ports;
    providing in the device circuitry defining a plurality of differential signaling paths between the SFP Ports;
    connecting a first SFP Port of the device to a first network service provider equipment;
    connecting a second SFP Port of the device to the first network provider equipment;
    connecting a third SFP Port of the device to a second network communication equipment;

connecting a fourth SFP Port of the device to the first network service provider equipment;

providing communication services between the first network service provider equipment and the second network communication equipment via the first SFP Port and the third SFP Port;

providing at least one of remote service monitoring, and signal injecting via the second SPF Port;

providing at least one of remote service monitoring, signal injecting and redundancy via the fourth SFP Port; and establishing a demarcation point or line between the device and the second network communication equipment.

17. A demarcation device for communications services, comprising:

a plurality of Small Form-factor Pluggable SFP Ports; and circuitry defining a plurality of differential signaling paths between the ports, wherein the circuitry includes a plurality of input differential amplifiers, a plurality of multiplexer switchers, and a plurality output differential amplifiers;

wherein the plurality of differential signaling paths are adapted to provide at least one of remote service monitoring, remote signal injecting and redundancy; and wherein the SFP Ports define at least one demarcation point or line;

wherein each of the plurality of multiplexer switches is selectively configured to simultaneously connect one differential signal input path to two differential signal output paths.

18. A system for establishing at least one demarcation point or line between a first communications network and at least one of a second communications network and a third communications network, the system comprising:

a device having a plurality of Small Form-factor Pluggable SFP Ports, and circuitry having a plurality of input differential amplifiers, a plurality of multiplexer switchers, and a plurality output differential amplifiers, wherein the circuitry defines a plurality of paths between the plurality of SFP Ports;

a plurality of SFP devices connected to the plurality of SFP Ports, one per port; and a demarcation point or line defined by one of the plurality of SFP Ports;

wherein each of the plurality of Multiplexer switches is selectively configured to simultaneously connect one differential signal input, path to two differential signal output paths.

* * * * *